US012215522B2

(12) United States Patent
Huang

(10) Patent No.: US 12,215,522 B2
(45) Date of Patent: Feb. 4, 2025

(54) ELECTRONIC CONTROL DOOR LOCK

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 385 days.

(21) Appl. No.: 17/859,201

(22) Filed: Jul. 7, 2022

(65) Prior Publication Data

US 2024/0003165 A1 Jan. 4, 2024

(51) Int. Cl.
*E05B 47/00* (2006.01)

(52) U.S. Cl.
CPC .. *E05B 47/0012* (2013.01); *E05B 2047/0017* (2013.01); *E05B 2047/0036* (2013.01)

(58) Field of Classification Search
CPC ............. E05B 47/0012; E05B 47/0642; E05B 47/0661; E05B 2047/0017; E05B 2047/0036; E05B 2047/0069; E05B 2047/0031; E05B 63/10
See application file for complete search history.

(56) References Cited

U.S. PATENT DOCUMENTS

| | | | |
|---|---|---|---|
| 6,177,771 | B1 | 1/2001 | Kinzer et al. |
| 6,634,140 | B1 | 10/2003 | Sellman |
| 6,786,006 | B2 | 9/2004 | Kowalczyk et al. |
| 6,891,479 | B1 | 5/2005 | Eccleston |
| 7,051,403 | B2 | 5/2006 | Homberg |
| 7,061,197 | B1 | 6/2006 | Mullet et al. |
| 7,068,179 | B2 | 6/2006 | Snell et al. |
| 7,143,547 | B2 | 12/2006 | Liles, Jr. |
| 7,234,201 | B2 | 6/2007 | Brown et al. |
| 7,282,883 | B2 | 10/2007 | Mullet et al. |
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,717,155 | B2 | 5/2010 | Mullet |
| 7,774,984 | B2 | 8/2010 | Hsu |
| 7,966,771 | B2 | 6/2011 | Bienek |
| 8,109,038 | B2 | 2/2012 | Houser et al. |
| 8,169,169 | B2 | 5/2012 | Hass et al. |
| 8,248,005 | B2 | 8/2012 | Romer |
| 8,390,219 | B2 | 3/2013 | Houser |
| 8,393,054 | B2 | 3/2013 | Bienek |
| 8,407,937 | B2 | 4/2013 | Houser |

(Continued)

*Primary Examiner* — Michael P Ferguson
*Assistant Examiner* — Thomas L Neubauer
(74) *Attorney, Agent, or Firm* — Ying-Ting Chen; Law Office of Michael Chen

(57) ABSTRACT

An electric control door lock includes an inner operational device, an outer operational device, and a latch bolt operably connected to the inner and outer operational devices. A rotating shaft is rotatably supported in an activation member and includes a driving threaded in threading connection with a driving spring. When the rotating shaft is driven by a motor to rotate, the driving spring moves along a longitudinal axis to actuate the activation member. Movement of the activation member is used to control operation of the outer operational device, thereby permitting or not permitting movement of the latch bolt to the unlatching position.

7 Claims, 17 Drawing Sheets

(56) References Cited

U.S. PATENT DOCUMENTS

| | | | | |
|---|---|---|---|---|
| 8,415,902 | B2 | 4/2013 | Burris et al. | |
| 8,434,268 | B2 | 5/2013 | Nixon | |
| 8,499,495 | B2 | 8/2013 | Houser et al. | |
| 8,547,046 | B2 | 10/2013 | Burris et al. | |
| 8,601,744 | B2 | 12/2013 | Wildforster et al. | |
| 8,695,277 | B2 | 4/2014 | Romer et al. | |
| 8,826,598 | B2 | 9/2014 | Ranaudo et al. | |
| 8,875,344 | B2 | 11/2014 | Salutzki et al. | |
| 8,904,710 | B2 | 12/2014 | Romer et al. | |
| 8,963,683 | B2 | 2/2015 | Romer | |
| 9,003,630 | B2 | 4/2015 | Hufen | |
| 9,045,927 | B1 | 6/2015 | Hoffberg | |
| 9,097,051 | B2 | 8/2015 | Hellwig | |
| 9,115,526 | B2 | 8/2015 | Houser et al. | |
| 9,121,217 | B1 | 9/2015 | Hoffberg | |
| 9,163,446 | B2 | 10/2015 | Houser et al. | |
| 9,181,744 | B2 | 11/2015 | Salutzki et al. | |
| 9,187,942 | B2 | 11/2015 | Wildforster | |
| 9,297,194 | B2 | 3/2016 | Bienek et al. | |
| 9,506,284 | B2 | 11/2016 | Braverman et al. | |
| 9,514,583 | B2 | 12/2016 | Zasowski et al. | |
| 9,631,412 | B2 | 4/2017 | Hellwig et al. | |
| 9,683,378 | B2 | 6/2017 | Houser et al. | |
| 9,695,620 | B2 | 7/2017 | Zasowski et al. | |
| 9,787,127 | B2 * | 10/2017 | Shen | E05B 63/16 |
| 9,869,117 | B2 | 1/2018 | Houser et al. | |
| 9,995,076 | B1 | 6/2018 | Hoffberg | |
| 10,006,236 | B2 | 6/2018 | Hellwig et al. | |
| 10,024,094 | B2 | 7/2018 | Bell et al. | |
| 10,030,425 | B2 | 7/2018 | Zasowski et al. | |
| 10,030,426 | B2 | 7/2018 | Langenberg | |
| 10,077,591 | B2 | 9/2018 | Hass | |
| 10,180,023 | B2 | 1/2019 | Zasowski et al. | |
| 10,208,520 | B2 | 2/2019 | Long et al. | |
| 10,236,801 | B2 | 3/2019 | Dye et al. | |
| 10,253,540 | B2 | 4/2019 | Bell et al. | |
| 10,280,670 | B2 | 5/2019 | Roberts | |
| 10,280,678 | B1 | 5/2019 | Rendon, Jr. et al. | |
| 10,304,272 | B2 | 5/2019 | Kvinge et al. | |
| 10,344,502 | B2 | 7/2019 | McKibben et al. | |
| 10,415,301 | B2 | 9/2019 | Kuan | |
| 10,472,873 | B2 | 11/2019 | Ladha et al. | |
| 10,559,151 | B2 | 2/2020 | Kvinge et al. | |
| 10,704,310 | B1 | 7/2020 | Barbon et al. | |
| 10,704,313 | B2 | 7/2020 | Houser et al. | |
| 10,724,288 | B2 | 7/2020 | Baumgarte | |
| 2005/0154612 | A1 | 7/2005 | Smith et al. | |
| 2007/0256362 | A1 | 11/2007 | Hansen | |
| 2013/0009785 | A1 | 1/2013 | Finn et al. | |
| 2013/0031940 | A1 * | 2/2013 | Romero | E05B 13/004 70/278.1 |
| 2014/0255252 | A1 | 9/2014 | Stratman et al. | |
| 2016/0348415 | A1 | 12/2016 | Baumgarte | |
| 2018/0334841 | A1 | 11/2018 | Langenberg et al. | |
| 2019/0043296 | A1 | 2/2019 | Baumgarte et al. | |
| 2019/0145138 | A1 | 5/2019 | Eickhoff | |
| 2019/0153764 | A1 | 5/2019 | Baumgarte | |
| 2019/0264486 | A1 | 8/2019 | Toloday et al. | |
| 2019/0319557 | A1 | 10/2019 | Dye et al. | |
| 2019/0338576 | A1 | 11/2019 | Wang | |
| 2019/0345738 | A1 | 11/2019 | McKibben et al. | |
| 2019/0383080 | A1 | 12/2019 | Barbon et al. | |
| 2020/0190885 | A1 | 6/2020 | Coleman | |
| 2020/0256108 | A1 | 8/2020 | Shetty et al. | |
| 2021/0023248 | A1 | 1/2021 | Townsend et al. | |
| 2021/0056791 | A1 | 2/2021 | Shen | |

* cited by examiner

ELECTRONIC CONTROL DOOR LOCK

BACKGROUND OF THE INVENTION

The present invention relates to a door lock and, more particularly, to a door lock that can be installed on a door and can be locked and unlocked by an electric motor.

Currently available locks, such as cylindrical locks, can be locked and unlocked through electronic control. These locks are generally mounted on doors to control opening of the doors and generally include a lock driving device having an motor that can operate to actuate movements of related components to thereby control locking and unlocking. To avoid mistaken operation of users, the lock driving device is complicated in the mechanical structure, such that the manufacturing costs for processing and assembly are increased. Furthermore, the complicated mechanical structure of the lock driving device is apt to damage.

BRIEF SUMMARY OF THE INVENTION

To solve the above drawbacks, the present invention provides an electronic control door lock comprising:

- a latch device including a latch bolt movable between a latching position and an unlatching position;
- an inner operational device operatively connected to the latch device for moving the latch bolt from the latching position to the unlatching position;
- an outer operational device operatively connected to the latch device for moving the latch bolt from the latching position to the unlatching position;
- an activation member movable between a first position and a second position, wherein when the activation member is in the first position, the outer operational device is incapable of moving the latch bolt to the unlatching position, and wherein when the activation member is in the second position, the outer operational device is operable to move the latch bolt to the unlatching position;
- a rotating shaft rotatably supported in the activation member and including a driving thread on an outer periphery thereof;
- a motor disposed in the inner operational device and configured to drive the rotating shaft to rotate in a forward direction and a reverse direction; and
- a driving spring in threading connection with the driving thread, wherein when the rotating shaft rotates in the reverse direction, the driving spring actuates the activation member to move to the first position along a longitudinal axis, and wherein when the rotating shaft rotates in the forward direction, the driving spring actuates the activation member to move to the second position along the longitudinal axis.

The components of the lock driving device according to the present invention are significantly reduced in complexity to reduce difficulties in manufacturing. Furthermore, the number of components related lock driving device is reduced to effectively reduce the manufacturing costs.

In an example, the activation member further includes a guiding groove extending along the longitudinal axis. The driving thread and the driving spring are disposed in the guiding groove. The driving spring includes first and second driving sections spaced from each other along the longitudinal axis. A spacing between the first and second driving sections along the longitudinal axis is approximately ⅔ to ¾ of a length of the guiding groove along the longitudinal axis. When the rotating shaft rotates in the forward direction, the first driving section actuates the activation member to move to the second position. When the rotating shaft rotates in the reverse direction, the second driving section actuates the activation member to move to the first position. When the activation member remains in the first position while the rotating shaft rotates in the forward direction, a portion of the driving spring between the first driving section and the driving thread is compressed. When the activation member remains in the second position while the rotating shaft rotates in the reverse direction, another portion of the driving spring between the second driving section and the driving thread is compressed.

The spacing between the first and second driving sections of the driving spring along the longitudinal axis is smaller than the length of the guiding groove along the longitudinal axis, such that the driving spring can push the activation member to move, and excessive compression of the driving spring can be prevented while generating appropriate elasticity as well as avoiding interference between related components (the frictional force is appropriate).

In an example, the driving thread includes two turns.

The driving thread has only two turns (two pitches), which can prevent excessive compression of driving spring.

In an example, the guiding groove has elliptic cross sections, and each of the first and second driving sections is a rectilinear section extending in a tangential direction of the driving spring and abuts an inner surface of the guiding groove.

In an example, the activation member includes a sleeve portion and an activation portion. The sleeve portion is mounted around and rotatable relative to the rotating shaft. The sleeve portion includes an inner end and an outer end spaced from the inner end along the longitudinal axis. The sleeve portion further includes a guiding groove extending along the longitudinal axis and spaced from the inner end and the outer end. The driving thread and the driving spring are located in the guiding groove. The activation portion is in frictional contact with the outer end of the sleeve portion. The activation portion includes a leg extending in a radial direction perpendicular to the longitudinal axis. The outer operational device includes an outer spindle and an outer handle coupled with the outer spindle to pivot therewith. The leg and the outer spindle are movable along the longitudinal axis and are not pivotable relative to each other. When the rotating shaft rotates, the activation portion prevents rotation of the sleeve portion.

In an example, the driving spring further includes first and second driving sections spaced from each other along the longitudinal axis. A spacing between the first and second driving sections along the longitudinal axis is approximately ⅔ to ¾ of a length of the guiding groove along the longitudinal axis. The first driving section faces the inner end of the sleeve portion. The second driving section faces the outer end of the sleeve portion. When the rotating shaft rotates in the forward direction, the first driving section actuates the activation member to move to the second position. When the rotating shaft rotates in the reverse direction, the second driving section actuates the activation member to move to the first position. When the activation member remains in the first position while the rotating shaft rotates in the forward direction, a portion of the driving spring between the first driving section and the driving thread is compressed. When the activation member remains in the second position while the rotating shaft rotates in the reverse direction, another portion of the driving spring between the second driving section and the driving thread is compressed.

In an example, a limiting member includes a head and a shank extending from the head. The shank of the limiting member and the activation portion are coupled and movable along the longitudinal axis. A limiting spring is mounted around the shank and located between the activation portion and the head. The limiting spring biases the activation portion to press against the outer end of the sleeve portion, such that a frictional force is generated between the sleeve portion and the activation portion.

In an example, the outer operational device further includes an actuating member pivotably mounted around the outer spindle. The actuating member includes a stop wall on an inner side thereof. The actuating member is operatively connected to the latch device. When the actuating member pivots, the latch bolt is movable between the latching position and the unlatching position. The activation portion is pivotably received in the actuating member. The rotating shaft further includes an abutting end and a coupling end spaced from the abutting end along the longitudinal axis. The motor is configured to couple with the coupling end to drive the rotating shaft to rotate. The abutting end is adjacent to the stop wall.

In an example, the motor is received a housing having an arm extending from an outer periphery of the housing. The arm is non-rotatably coupled with the inner operational device.

The present invention will become clearer in light of the following detailed description of illustrative embodiments of this invention described in connection with the drawings.

Figure 1:
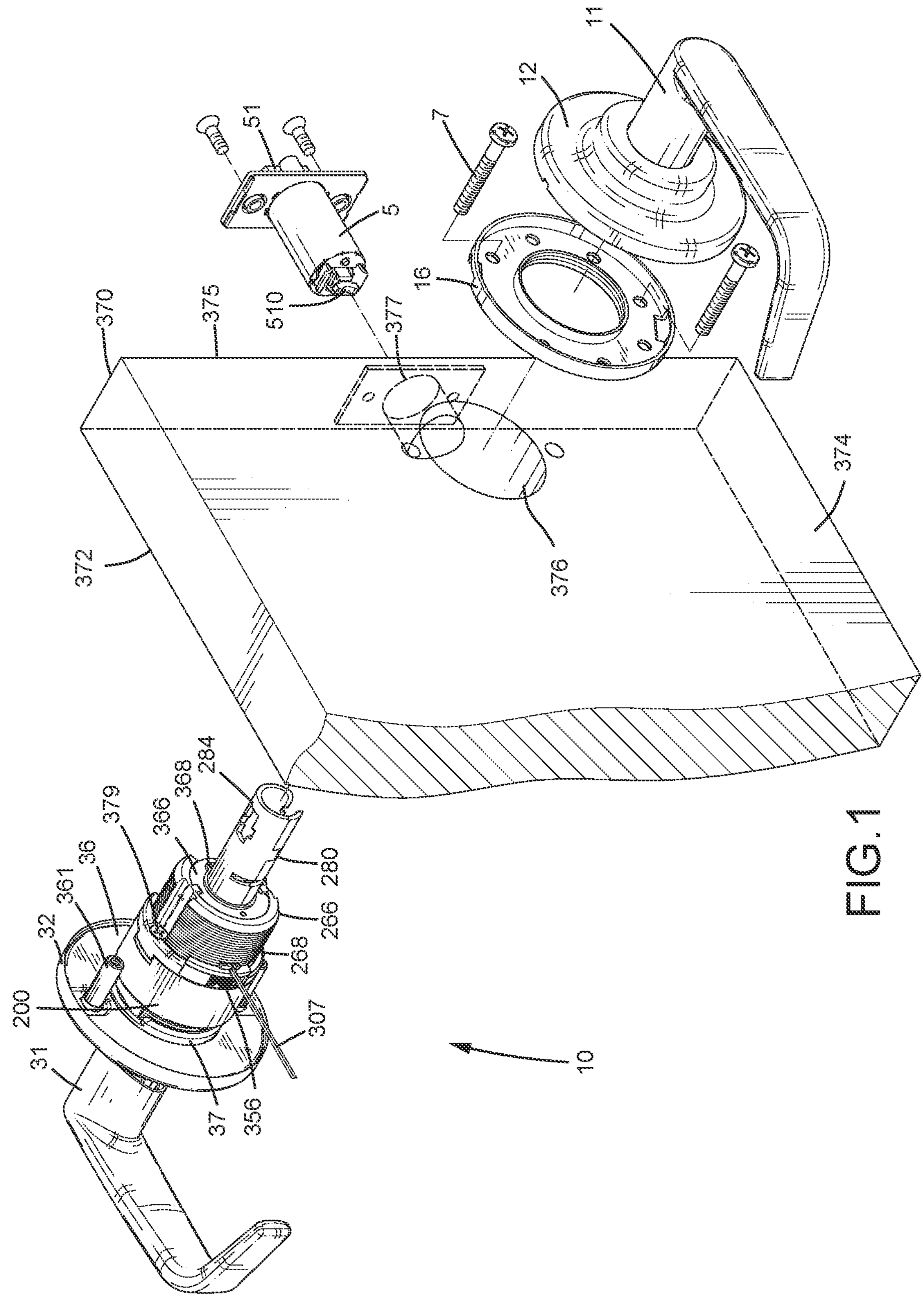
FIG. 1 is a partial, exploded, perspective view illustrating a portion of a door and a door lock of an embodiment according to the present invention.
Figure 1A:
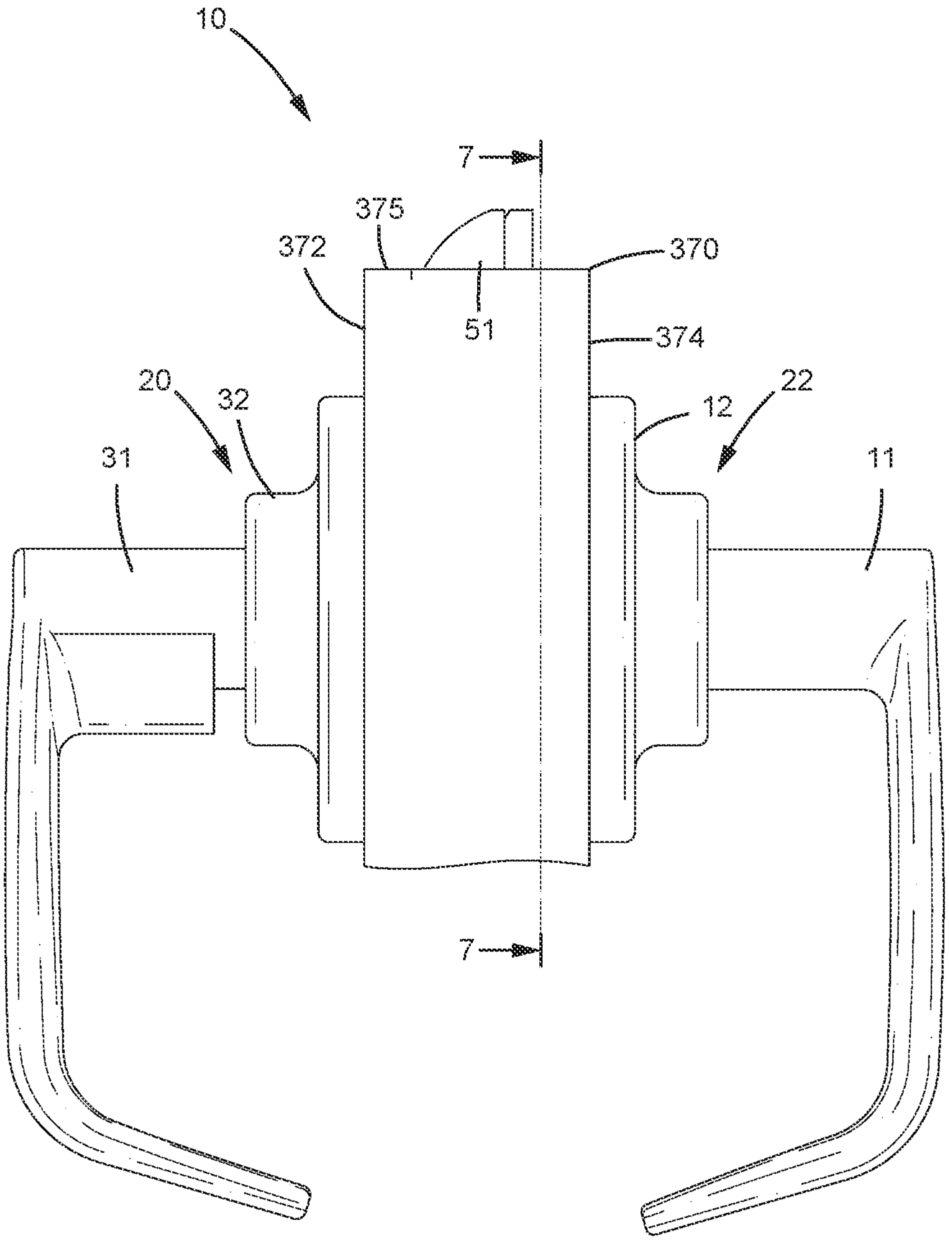
FIG. 1A is a top view of the door and the door lock of FIG. 1 after installation.
Figure 2:
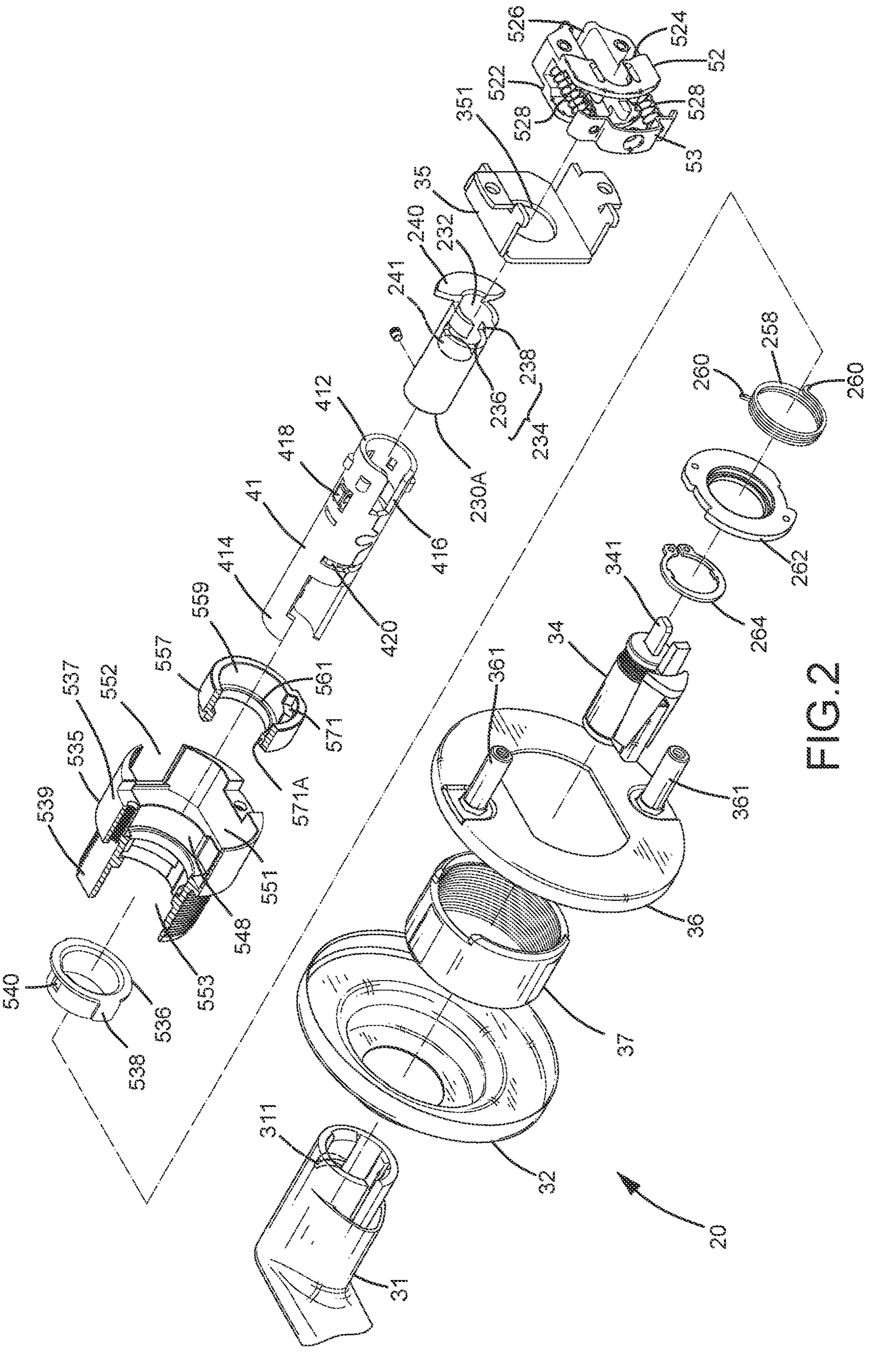
FIG. 2 is an exploded, perspective view of an outer operational device of the door lock of FIG. 1.
Figure 3:
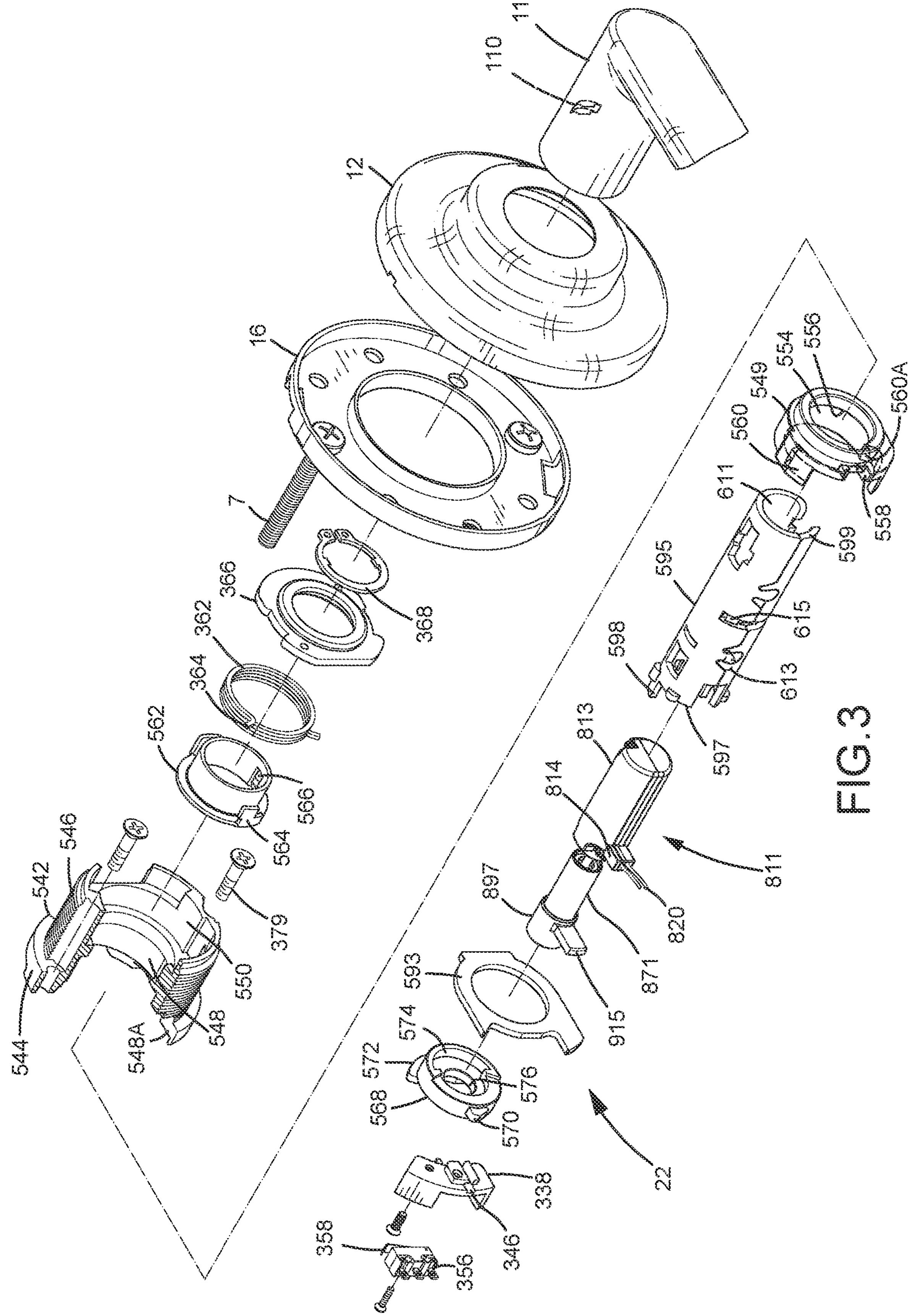
FIG. 3 is an exploded, perspective view of an inner operational device of the door lock of FIG. 1.
Figure 4:
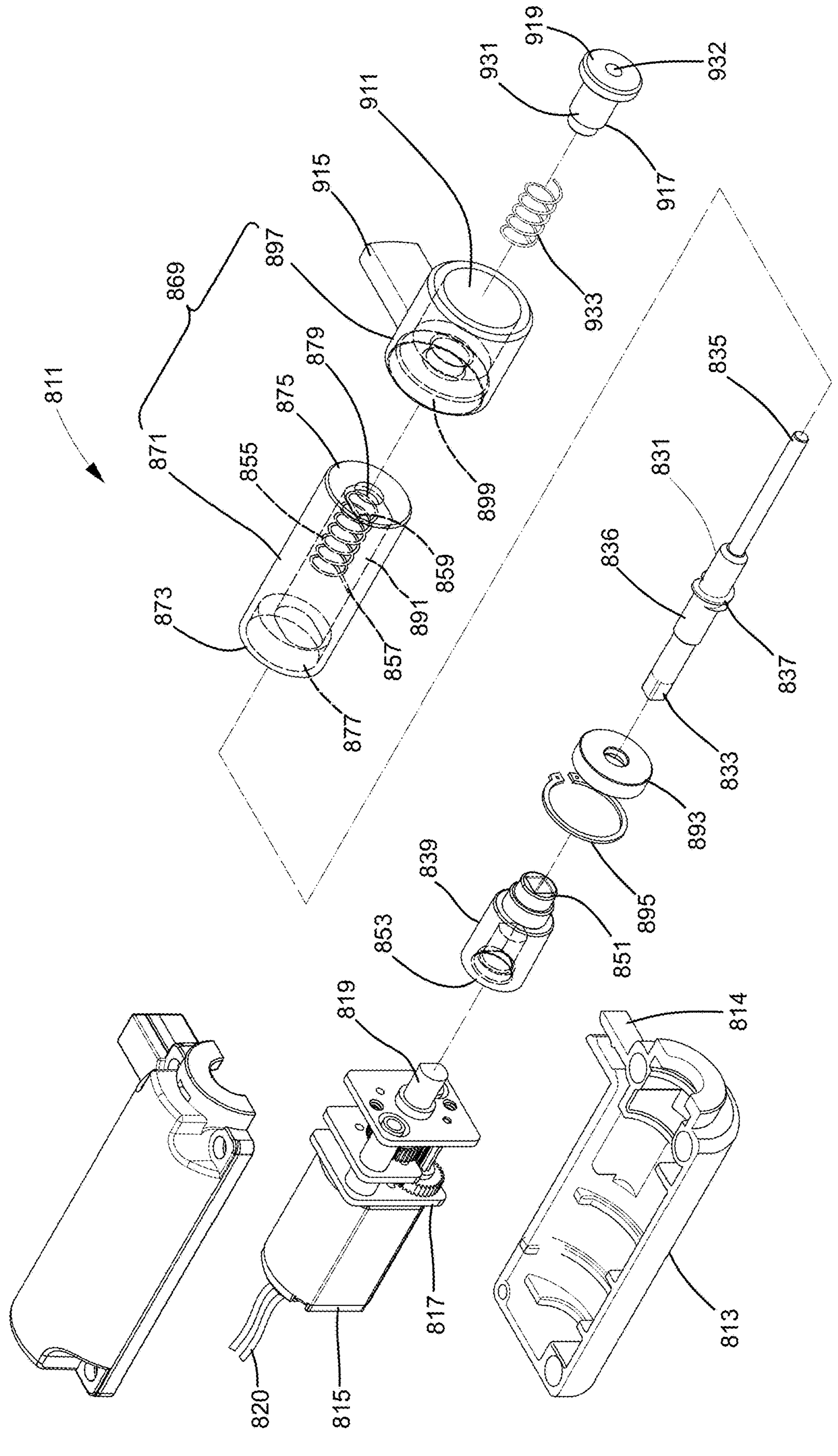
FIG. 4 is an exploded, perspective view of a lock driving device of the door lock of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “third”, “inner”, “outer”, “side”, “end”, “portion”, “section”, “longitudinal”, “radial”, “circumferential”, “lateral”, “horizontal”, “outward”, “forward”, “rearward”, “spacing”, “length”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

An electronic control door lock 10 (hereinafter referred to as “door lock 10”) of an embodiment according to the present invention is in the form of a cylindrical lock and can be locked and unlocked through electronic control. With reference to FIGS. 1-7, door lock 10 comprises an outer chassis 535 having first and second portions 537 and 539 spaced along a longitudinal axis of outer chassis 535. Each of first and second portions 537 and 539 has an end face. A first compartment 551 extends along the longitudinal axis from the end face of first portion 537 towards but spaced from the end face of second portion 539. A notch 552 extends in a radial direction perpendicular to the longitudinal axis from an outer periphery of first portion 537 to first compartment 551. A second compartment 553 extends from the end face of second portion 539 towards but spaced from first portion 537. A third compartment 555 extends from a bottom face of first compartment 551 to second compartment 553 along the longitudinal axis. A lining sleeve 557 is securely mounted in third compartment 555 of outer chassis 535. Inner lining sleeve 557 includes a first end face facing and spaced from first compartment 551 along the longitudinal axis and a second end face. Lining sleeve 557 includes an axial hole 559 extending from the first end face of lining sleeve 557 through the second end face of lining sleeve 557. Axial hole 559 includes a larger hole section and a smaller hole section. A shoulder 561 is formed at in intersection between the larger hole section and the smaller hole section. Axial hole 559 intercommunicates with first compartment 551 and second compartment 553. A limiting groove 571 is formed in an inner periphery of axial hole 559, extends to the first end face of lining sleeve 557, and is substantially C-shaped in cross section. Lining sleeve 557 further includes a coupling groove 571A extending from an intermediate portion of limiting groove 571 along the longitudinal axis.

Door lock 10 further includes an outer spindle 41 having first and second ends 412 and 414 spaced along the longitudinal axis A plurality of protrusions is formed on an outer periphery of first end 412 of outer spindle 41. The protrusions are spaced from each other in a circumferential direction and form a stop portion. A passageway 416 extends from an end face of first end 412 towards but spaced from second end 414. Outer spindle 41 further includes a protrusion 418 extending from an outer periphery of first end 412. An outer engaging plate 420 is received in outer spindle 41 and is positioned by elasticity. An end of outer engaging plate 420 is located outside of outer spindle 41 (see FIG. 6). Outer spindle 41 is rotatably mounted to outer chassis 535. Specifically, first end 412 of outer spindle 41 is received in axial hole 559 of lining sleeve 557. The outer periphery of first end 412 of outer spindle 41 rotatably abuts the inner periphery of axial hole 559 of lining sleeve 557. The stop portion at first end 412 of outer spindle 41 rotatably abuts shoulder 561 of axial hole 559. Passageway 416 of outer spindle 41 is aligned with limiting groove 571. Second end 414 of outer spindle 41 is located outside of outer chassis 535. Protrusion 418 of outer spindle 41 is received in second compartment 553.

Door lock 10 further includes an outer spring 258, an outer cover 262, an outer follower ring 536, and an outer retainer ring 264. Outer follower ring 536 is mounted around outer spindle 41 and is received in second compartment 553. Outer follower ring 536 includes an actuating arm 538 on an outer periphery thereof and an engagement groove 540 in the outer periphery thereof. Engagement groove 540 engages with protrusion 418 of outer spindle 41. Outer spring 258 is in the form of a torsion spring having two tangs 260. Outer spring 258 is mounted around outer follower ring 536 and is located in second compartment 553, with tangs 260 located on opposite sides of actuating arm 538 of outer follower ring 536 and with tangs 260 engaged with an inner wall of second compartment 553, such that one of tangs 260 is pivoted by actuating arm 538 and the other tang 260 is not moved when outer spindle 41 is rotated to pivot outer follower ring 536, providing elasticity for returning outer spindle 41. Outer cover 262 is mounted around outer spindle 41 and closes an end opening of second compartment 553, preventing outer spring 258 from disengaging from second compartment 553 along the longitudinal axis. Outer retainer ring 264 is mounted to the outer periphery of outer spindle 41 and is located outside of outer chassis 535. Outer retainer ring 264 abuts an outer face of outer cover 262. Furthermore, since first end 412 of outer spindle 41 abuts shoulder 561 of lining sleeve 557, outer spindle 41 can not move relative to outer chassis 535 along the longitudinal axis.

Door lock 10 further includes an actuating member 230A rotatably received in outer spindle 41. A space 232 extends from a first end of actuating member 230A along the longitudinal axis towards but spaced from a second end of actuating member 230A. Space 232 includes a stop wall 241. A limiting groove 234 extends from an end face of the first end of actuating member 230A towards but spaced from the second end of actuating member 230A along the longitudinal axis and intercommunicates with space 232. Limiting groove 234 has larger and smaller groove sections 236 and 238 extending in a circumferential direction about the longitudinal axis. Larger and smaller groove sections 236 and 238 intercommunicate with each other. An arc of larger groove section 236 in the circumferential direction is larger than that of smaller groove section 238. Actuating member 230A further includes a sector-shaped lug 240 extending outward from the first end of actuating member 230A and extending in the circumferential direction. In the form shown, smaller groove section 238 extends from an end face of the first end of actuating member 230A to larger groove section 236 along the longitudinal axis and is located between larger groove section 236 and lug 240. Limiting groove 234 of actuating member 230A is aligned with passageway 416 of outer spindle 41. Lug 240 is located outside of outer spindle 41 and is received in first compartment 551 of outer chassis 535.

Door lock 10 further includes a partitioning plate 35, a retractor 52, a positioning plate 53, and two springs 528. Partitioning plate 35 has two sides spaced along the longitudinal axis and a through-hole 351 extending from a side through the other side of partitioning plate 35. Retractor 52 has first and second actuation walls 522 and 524 spaced along the longitudinal axis and a connecting end 526 between first and second actuation walls 522 and 524. Partitioning plate 35 is received in first compartment 551 of outer chassis 535, with a side of partitioning plate 35 abutting an end wall of first compartment 551 and with through-hole 351 aligned with axial hole 559 of lining sleeve 557. Retractor 52 is movably received in first compartment 551 of outer chassis 535. First actuation wall 522 faces partitioning plate 35. Connecting end 526 of retractor 52 is aligned with notch 552 of outer chassis 535. Springs 528 are mounted between positioning plate 53 and retractor 52. Specifically, each spring 528 has an end fixed to positioning plate 53. The other end of each spring 528 abuts against retractor 52. Lug 240 of actuating member 230A is contiguous to first actuation wall 522 of retractor 52. Retractor 52 is movable in a lateral direction between a forward position (FIG. 6) close to notch 552 and a rearward position (FIG. 11) away from notch 552. Springs 528 bias retractor 52 from the rearward position to the forward position.

Door lock 10 further includes an inner chassis 542 engaged with outer chassis 535. Inner chassis 542 includes first and second ends spaced along the longitudinal axis and respectively having an engaging portion 546 and a flange 544 spaced from engaging portion 546 along the longitudinal axis. A first chamber 548 extends from an end face of the first end of inner chassis 542 towards but spaced from the second end of inner chassis 542. A second chamber 550 extends from an end face of the second end of inner chassis 542 to first chamber 548. A sector-shaped insertion groove 548A is formed in a surface of flange 544 facing outer chassis 535. A lining sleeve 549 is securely mounted in first chamber 548 of inner chassis 542. Lining sleeve 549 includes an axial hole 554 extending from an end of lining sleeve 549 through the other end of lining sleeve 549. Axial hole 554 includes a smaller hole section and a larger hole section. A shoulder 556 is formed at an intersection between the smaller section and the larger section of axial hole 554. A restraining groove 560 is defined in an inner periphery of the larger hole section of axial hole 554. Restraining groove 560 includes two restraining walls 560A spaced from each other in a circumferential direction about a longitudinal axis of axial hole 554 coincident with the longitudinal axis of outer chassis 535. A fixing groove 558 is defined in a bottom wall of restraining groove 560 and intercommunicates with the larger hole section of axial hole 554. Furthermore, a pressing plate 593 is mounted in inner chassis 542 and is located adjacent to an opening of first chamber 548 to cover first chamber 548.

Door lock 10 further includes an inner spindle 595 rotatably received in axial hole 554 of inner sleeve 549. Inner spindle 595 includes first and second ends 597 and 599 spaced from each other along the longitudinal axis. An engagement portion 598 extends from first end 597 of inner spindle 595 along the longitudinal axis. A plurality of protrusions is formed on an outer periphery of first end 597 of inner spindle 595 and forms a stop portion. A receiving hole 611 extends from first end 597 through second end 599 of inner spindle 595 along the longitudinal axis. A protrusion 613 is formed on an outer periphery of inner spindle 595, extends in the circumferential direction about the longitudinal axis, and is located adjacent to first end 597 of inner chassis 542. An inner engaging plate 615 is received in inner spindle 595 and positioned by elasticity.

An end of inner engaging plate 615 is located outside of inner spindle 595. First end 597 of inner spindle 595 is received in axial hole 554 of lining sleeve 549. The stop portion on first end 597 of inner spindle 595 abuts shoulder 556 of lining sleeve 549. Protrusion 613 of inner spindle 595 is located in second chamber 550 of inner chassis 542. Second end 599 of inner spindle 595 is outside of inner chassis 542.

Door lock 10 further includes an inner spring 362, an inner cover 366, an inner follower ring 562, and an inner retainer ring 368. Inner follower ring 562 is mounted around inner spindle 595 and is located in second chamber 550 of inner chassis 542. Inner follower ring 562 includes an actuating arm 564 on an outer periphery thereof and an engagement groove 566 in the outer periphery thereof. Protrusion 613 of inner spindle 595 is engaged in engagement groove 566. Inner spring 362 is in the form of a torsion spring and has two tangs 364.

Inner spring 362 is mounted around inner follower ring 562 and is located in second chamber 550 of inner chassis 542. Tangs 364 of inner spring 362 elastically sandwiches two sides of actuating arm 564 of inner follower ring 562. Furthermore, each tang 364 of inner spring 362 are attached to two sides on a rib on the inner periphery of second chamber 550 of inner chassis 542. Thus, one of tangs 364 is pivoted by actuating arm 564 and the other tang 364 is not moved when inner spindle 595 is rotated to pivot inner follower ring 562, providing elasticity for returning inner spindle 595.

Inner cover 366 is mounted around inner spindle 595 and closes an end opening of second chamber 550 of inner chassis 542, preventing inner spring 362 from disengaging from second chamber 550. Inner retainer ring 368 is mounted to the outer periphery of inner spindle 595 and is located outside of inner chassis 542. Inner retainer ring 368 abuts an outer face of inner cover 366. Thus, inner spindle 595 can not move relative to inner chassis 542 along the longitudinal axis.

Door lock 10 further includes a pressing member 568 received in first chamber 548 of inner chassis 542. Pressing member 568 includes a pressing block 570 extending radially from an outer periphery of pressing member 568 in a radial direction perpendicular to the longitudinal axis. A through-hole 576 extends from a first side of pressing member 568 through a second side of pressing member 568 along the longitudinal axis. An engagement groove 574 is defined in the first side of pressing member 568 and intercommunicates with through-hole 576. An ear 572 is formed on the second side of pressing member 568 and extends outward in a radial direction perpendicular to the longitudinal axis. Engagement portion 598 of inner spindle 595 engages with engagement groove 574 of pressing member 568. Pressing member 568 and inner spindle 595 can jointly rotate about the longitudinal axis of inner spindle 595 coincident with the longitudinal axis of outer chassis 535. Furthermore, pressing block 570 of pressing member 568 is received in restraining groove 560 of lining sleeve 549. Ear 572 of pressing member 568 is on an outer side of first chamber 548 of inner chassis 542 along the longitudinal axis and is coupled to second actuation wall 524 of retractor 52.

Door lock 10 further includes a seat 338 mounted in insertion groove 548A of inner chassis 542 and a detection member 356 mounted on seat 338. Detection member 356 can be in the form of a micro switch. Detection member 356 includes a pressable pressing plate 358 facing pressing member 568 (see FIG. 7). Detection member 356 is electrically connected to a power supply 378 and a burglarproof system 380.

Door lock 10 further includes an inner handle 11, an inner escutcheon 12, and an inner fixing board 16. Inner fixing board 16 is mounted to engaging portion 546 of inner chassis 542. Inner escutcheon 12 is mounted around inner fixing board 16 to cover engaging portion 546 of inner chassis 542. Inner handle 11 includes a positioning groove 110. Inner handle 11 is mounted around second end 599 of inner spindle 595 with the end of inner engaging plate 615 extending through an end of inner spindle 595 into positioning groove 110 of inner handle 11. Thus, inner handle 11 can not move along the longitudinal axis to disengage from inner spindle 595. When inner handle 11 is rotated about the longitudinal axis of inner spindle 595, inner spindle 595 rotates together with inner handle 11 through inner engaging plate 615, forming an inner operational device 22 operated by inner handle 11.

Flange 544 of inner chassis 542 abuts the end face of first portion 537 of outer chassis 535. Two screws 379 extend through flange 544 of inner chassis 542 into first portion 537 of outer chassis 535, fixing inner and outer chassis 542 and 535 together.

Door lock 10 further includes a lock driving device 811 having a housing 813. A distal end of housing 813 of lock driving device 811 is pivotably coupled with through-hole 576 of pressing member 568. An arm 814 extends in a radial direction from an outer periphery of housing 813.

Lock driving device 811 further includes a motor 815 mounted in housing 813. Motor 815 includes a speed reduction mechanism 817 and a driving shaft 819 extending beyond housing 813. Motor 815 is electrically connected to a wire 820 extending through arm 814 to an outer side of housing 813. Furthermore, wire 820 is secured in wire groove 346 to prevent damage to wire 820 due to twisting. When motor 639 operates, driving shaft 819 is driven at a lower speed via transmission by speed reduction mechanism 817.

Lock driving device 811 further includes a rotating shaft 831 coupled with driving shaft 819 to move therewith. Rotating shaft 831 includes a coupling end 833 and an abutting end 835 spaced from coupling end 833 along the longitudinal axis. Rotating shaft 831 further includes an intermediate section 836 between coupling end 833 and abutting end 835. A driving thread 837 formed by an outer threading is disposed on an outer periphery of intermediate section 836. Driving thread 837 has about two turns (two pitches).

Lock driving device 811 further includes a connecting member 839 disposed between motor 815 and rotating shaft 831. Connecting member 839 includes a first connecting end 851 and a second connecting end 853 spaced from first connecting end 851 along the longitudinal axis. Connecting member 839 is pivotably connected to housing 813. Second connecting end 853 is coupled with driving shaft 819 to rotate therewith. First connecting end 851 is coupled with coupling end 833 of rotating shaft 831 to rotate therewith. Thus, rotating shaft 831 rotates when motor 815 is activated.

With reference to FIGS. 4-6A, lock driving device 811 further includes an activation member 869. Activation member 869 includes a sleeve portion 871 and an activation portion 897. Sleeve portion 871 includes an inner end 873 and an outer end 875 spaced from inner end 873 along the longitudinal axis. Sleeve portion 871 further includes an end cap room 877 extending from inner end 873 along the longitudinal axis and a through-hole 879 extending from outer end 875 along the longitudinal axis. Sleeve portion 871 further includes a guiding groove 891 extending between through-hole 879 and end cap room 877 along the longitudinal axis. Guiding groove 891 has non-circular cross sections. In this embodiment, guiding groove 891 has elliptic cross sections.

Sleeve portion 871 is disposed around rotating shaft 831. Inter mediate section 836 of rotating shaft 831 is located in guiding groove 891 of sleeve portion 871. Abutting end 835 of rotating shaft 831 is located outside of outer end 875 of sleeve portion 875. Coupling end 833 is located outside of inner end 873 of sleeve portion 871.

Activation portion 897 includes a first room 899 and a second room 911 spaced from first room 899 along the longitudinal axis. In this embodiment, first room 899 extends from an end face of activation portion 897 along the longitudinal axis, and second room 911 extends from another end face of activation portion 897. A through-hole 913 extends between first and second rooms 899 and 911. A leg 915 extends from an outer periphery of activation portion 897 in a radial direction and is substantially smaller than smaller groove section 238 of limiting groove 234 of actuating member 230A.

First room 899 of activation portion 897 is coupled with outer end 875 of sleeve portion 871. Abutting end 835 of rotating shaft 831 extends through through-hole 913 and second room 911 to an outer side of activation portion 897.

An end cap 893 and an end cap retainer ring 895 are disposed in end cap room 877 of sleeve portion 871. End cap retainer ring 895 prevents end cap 893 from disengaging from sleeve portion 871 along the longitudinal axis. End cap 893 seals guiding groove 891. Coupling end 833 of rotating shaft 831 extends through end cap 893 to couple with connecting member 839.

A driving spring 855 is disposed in guiding groove 891 of sleeve portion 871. Driving spring 855 includes a first driving section 857 and a second driving section 859 on two ends thereof. Each of first and second driving sections 857 and 859 is a rectilinear section extending in a tangential direction of driving spring 855. Driving spring 855 is mounted around intermediate section 836 of rotating shaft 831 and is in threading connection with driving thread 837. First driving section 857 faces end cap 893 along the longitudinal axis. Second driving section 859 is located between first driving section 857 and outer end 875 of sleeve portion 871 along the longitudinal axis. Each of first and second driving sections 857 and 859 abuts an inner surface of guiding groove 891. Thus, driving spring 855 cannot rotate relative to sleeve portion 871 but can rotate relative to rotating shaft 831. Namely, driving spring 855 cannot rotate together with rotating shaft 831. Furthermore, when motor 815 operates to rotate rotating shaft 831, driving thread 837 pushes driving spring 855 to move along the longitudinal axis.

Furthermore, a spacing between first and second driving sections 857 and 859 along the longitudinal axis is smaller than a length of guiding groove 891 along the longitudinal axis. In an embodiment, the spacing between first and second driving sections 857 and 859 along the longitudinal axis is approximately ⅔-¾ of the length of guiding groove 891 along the longitudinal axis.

Lock driving device 811 further includes a limiting member 917 and a limiting spring 933. Limiting member 917 includes a head 919 and a shank 931 extending from an end face of head 919 along the longitudinal axis. Limiting member 917 further includes a movement hole 932 extending through shank 931 and head 919 along the longitudinal axis.

Limiting member 917 is received in second room 911 of activation member 897. Shaft 931 is slidably received in through-hole 913 of activation portion 897 along the longitudinal axis. Furthermore, shaft 931 is securely connected to through-hole 879 of sleeve portion 871, such that limiting member 917 and sleeve portion 871 can move jointly along the longitudinal axis. Activation portion 897 is allowed to move independently relative to limiting member 917 along the longitudinal axis.

Furthermore, abutting end 835 of rotating shaft 831 is movably coupled with movement hole 932 of limiting member 917. Limiting spring 933 is disposed around shank 931 of limiting member 917 and is located between an end face of second room 911 and head 919 along the longitudinal axis. Limiting spring 933 biases the end face of second room 911 of activation portion 897 to abut against outer end 875 of sleeve portion 871 (see FIG. 6A). Thus, frictional force is provided between activation portion 897 and sleeve portion 871.

Figure 5:
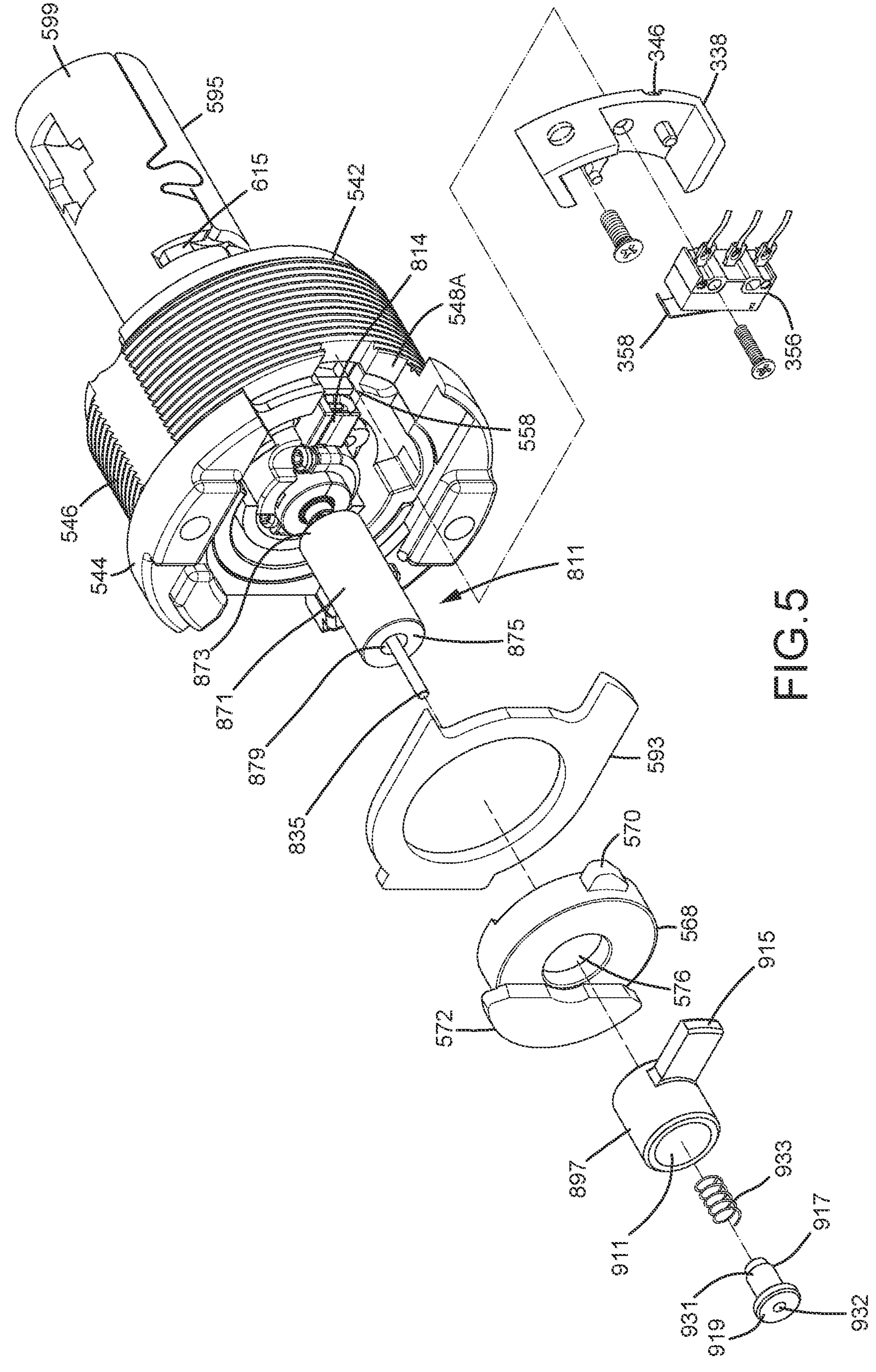
FIG. 5 is another exploded perspective view of the inner operational device.
Figure 6:
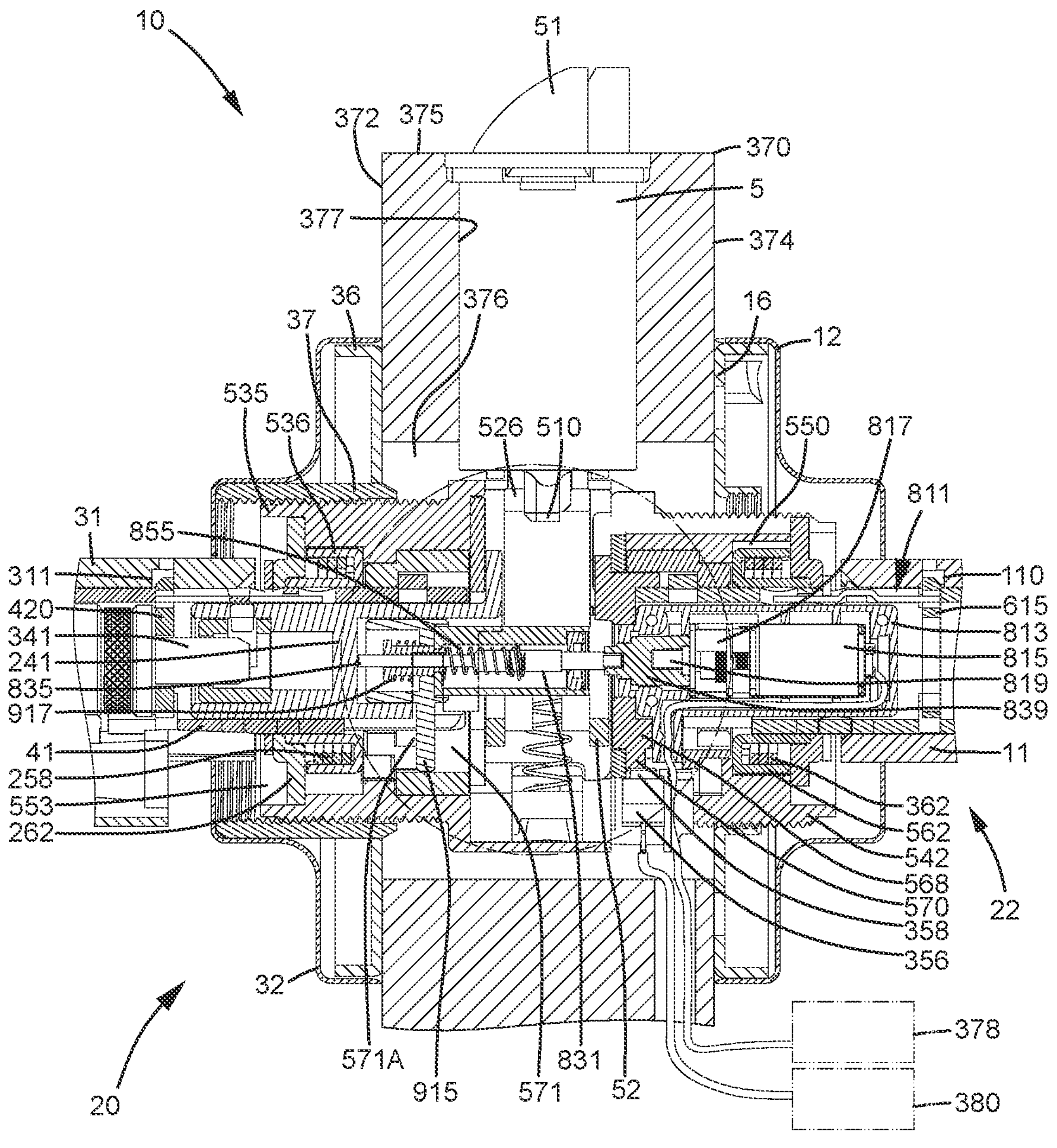
FIG. 6 is a transverse cross sectional view of the door lock of FIG. 1.
Figure 6A:
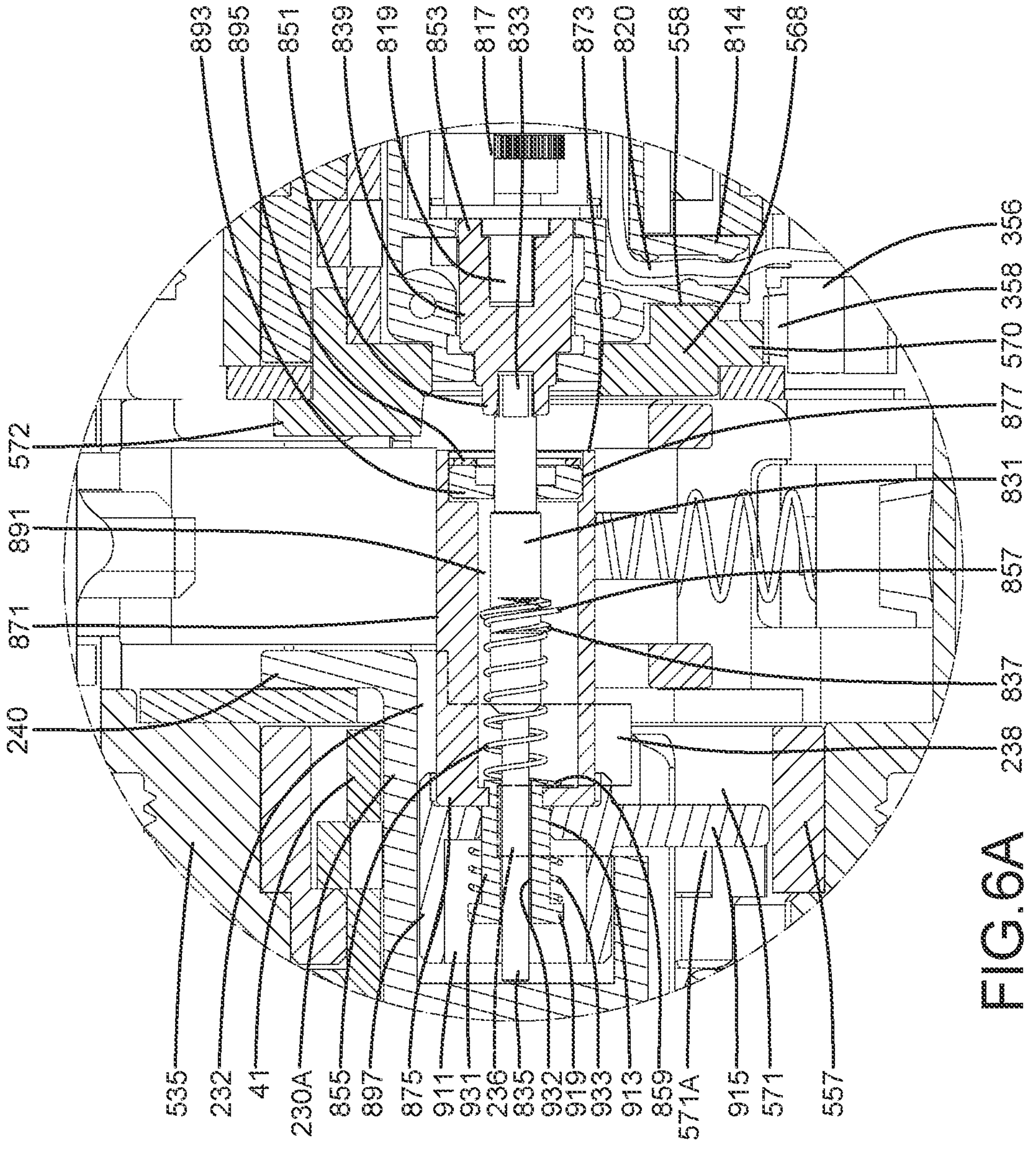
FIG. 6A is an enlarged view of a circled portion of FIG. 6.
Figure 7:
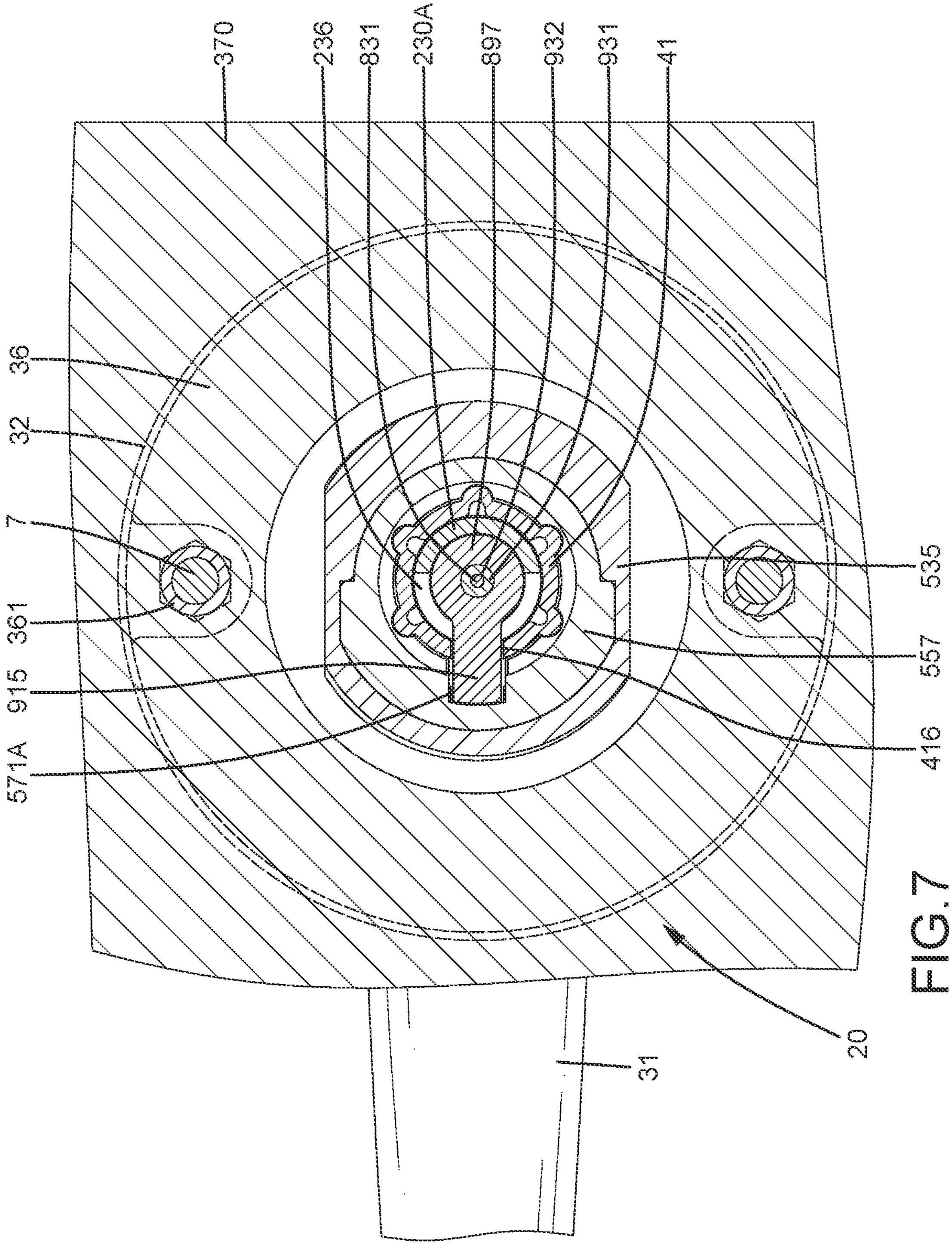
FIG. 7 is a cross sectional view taken along section line 7-7 in FIG. 1A.

With reference to FIGS. 5-7, lock driving device 811 is disposed between inner chassis 542 and outer chassis 535. Furthermore, the longitudinal axis of rotating shaft 831 is coincident with the longitudinal axis of outer chassis 535. Housing 813 is received in receiving hole 611 of inner spindle 595. Furthermore, arm 814 is coupled with fixing groove 558 of lining sleeve 549. Thus, when inner spindle 595 pivots, housing 813 does not rotate. Inner end 873 of sleeve portion 871, activation portion 897, limiting member 917, and limiting spring 933 are received in space 232 of actuating member 230A. Sleeve portion 897 extends through retractor 52. Leg 915 of activation portion 897 is received in limiting groove 234. Furthermore, Leg 915 is slidable in passageway 416 along the longitudinal axis but not rotatable relative to passageway 416. Thus, rotation of outer spindle 41 pushes leg 915 to cause pivotal movement of activation portion 897.

Furthermore, abutting end 835 of rotating shaft 831 is contiguous to stop wall 241 of actuating member 230A. Thus, rotating shaft 831 cannot move along the longitudinal axis. Furthermore, leg 915 is restricted by passageway 416 of outer spindle 41, such that activation portion 897 presses against outer end 875 of sleeve portion 871 to generate a frictional force. Thus, when rotating shaft 831 rotates, sleeve portion 871 does not rotate, and driving spring 855 moves along the longitudinal axis.

Door lock 10 is adapted to be mounted to a door 370 having inner and outer faces 374 and 372 spaced along the longitudinal axis and a lateral face 375 extending between inner and outer faces 374 and 372. Door 370 further includes a mounting space 376 extending from outer face 372 through inner face 374. Door 370 further includes a transverse hole 377 extending from lateral face 375 to mounting space 376 in a radial direction perpendicular to the longitudinal axis Inner chassis 542 and outer chassis 535 of door lock 10 are mounted in mounting space 376 of door 370. Second portion 539 of outer chassis 535 extends beyond mounting space 376 and is located at an outer side of door 370.

Engaging portion 546 of inner chassis 542 extends beyond mounting space 376 and is located at an inner side of door 370. Inner fixing board 16 abuts inner face 374 of door 370. Inner handle 11 is located at the inner side of door 370.

Door lock 10 further includes an outer escutcheon 32, an outer fixing board 36, and a pressing ring 37. Two mounting posts 361 are mounted to outer fixing board 36. Outer fixing board 36 is mounted around second portion 539 of outer chassis 535 with mounting posts 361 extending through door 370. Two screws 7 extend through inner fixing board 16 into screw holes in mounting posts 361, fixing inner and outer fixing boards 16 and 36 to inner and outer faces 374 and 372 of door 370. Thus, inner chassis 542 and outer chassis 535 are fixed to door 370. Pressing ring 37 is threadedly engaged on second portion 539 of outer chassis 535 and presses against outer fixing board 36. Outer escutcheon 32 is mounted around outer fixing board 36. Pressing ring 37 and second portion 539 of outer chassis 535 are located inside outer escutcheon 32.

Door lock 10 further includes an outer handle 31 and a lock core 34. Outer handle 31 includes a positioning hole 311. Lock core 34 includes a tail piece 341 extending along the longitudinal axis. Lock core 34 is received in outer handle 31. Outer handle 31 is mounted around second end 414 of outer spindle 41 with the end of outer engaging plate 420 engaged in positioning hole 311 of outer handle 31. Thus, outer handle 31 cannot disengage from outer spindle 41 along the longitudinal axis. When outer handle 31 rotates along the longitudinal axis, outer spindle 41 rotates jointly with outer handle 31. Tail piece 341 of lock core 34 extends through actuating member 230A and is connected to actuating member 230A to move therewith. When lock core 34 is rotated by a key, tail piece 341 drives and rotates jointly with actuating member 230A about the longitudinal axis of outer spindle 41. An outer operational device 20 operated by outer handle 31 is, thus, formed.

Door lock 10 further includes a latch device 5 having a latch bolt 51 movable between a latching position outside of door 370 and an unlatching position inside of door 370. Latch device 5 further includes an engagement portion 510 at an inner end thereof. Latch device 5 is mounted in transverse hole 377 of door 370 with latch bolt 51 located outside of lateral face 375 and with engagement portion 510 extending through notch 552 of outer chassis 535 and connected to connecting end 526 of retractor 52 to move therewith.

Now that the basic construction of door lock 10 of the embodiment of the present invention has been explained, the operation and some of the advantages of door lock 10 can be set forth and appreciated. In particular, for the sake of explanation, it will be assumed that door 370 is in a closed state, and door lock 10 is not operated (FIG. 5) with inner and outer handles 11 and 31 in horizontal positions. Retractor 52 is in the forward position with latch bolt 51 in the latching position. Activation member 869 is in the first position. With reference to FIGS. 5-7, in this state, leg 915 of activation member 869 is received in larger groove section 236 of actuating member 230A and coupling groove 571A of lining sleeve 549, such that activation portion 897 is not rotatable. Burglarproof system 380 is activated. Pressing block 570 of pressing member 568 presses against pressing plate 358 of detection member 356 (FIG. 6).

In a case that leg 915 of activation member 869 is in the first position, when a user intends to pivot outer handle 31 for pivoting outer spindle 41, outer spindle 41 is stopped by leg 915 and, thus, not pivotable, because activation portion 897 is not rotatable. Thus, outer handle 31 cannot be pivoted. Retractor 52 is biased by springs 528 to be in the forward position adjacent to notch 552 of outer chassis 535. Latch bolt 51 of latch device 5 remains in the latching position, and door lock 10 is in a locked state.

When door lock 10 is in the locked state, since leg 915 of activation member 869 is in larger groove section 236 of limiting groove 234, a key can be used to rotate tail piece 341 of lock core 34. Tail piece 341 drives actuating member 230A to pivot, such that lug 240 of actuating member 230A pushes first actuation wall 522 to move retractor 52 from the forward position to the rearward position (leg 915 pivots in larger groove section 236). Thus, latch bolt 51 moves from the latching position to the unlatching position, permitting opening of door 370.

When inner handle 11 is pivoted while activation member 869 is in the first position, inner spindle 595 pivots relative to housing 813 of lock driving device 811 (housing 813 does not pivot under restriction by lining sleeve 549). Ear 572 of pressing member 568 pushes second actuation wall 524 to move retractor 52 from the forward position to the rearward position, and latch bolt 51 moves from the latching position to the unlatching position, permitting opening of door 370.

Figure 8:
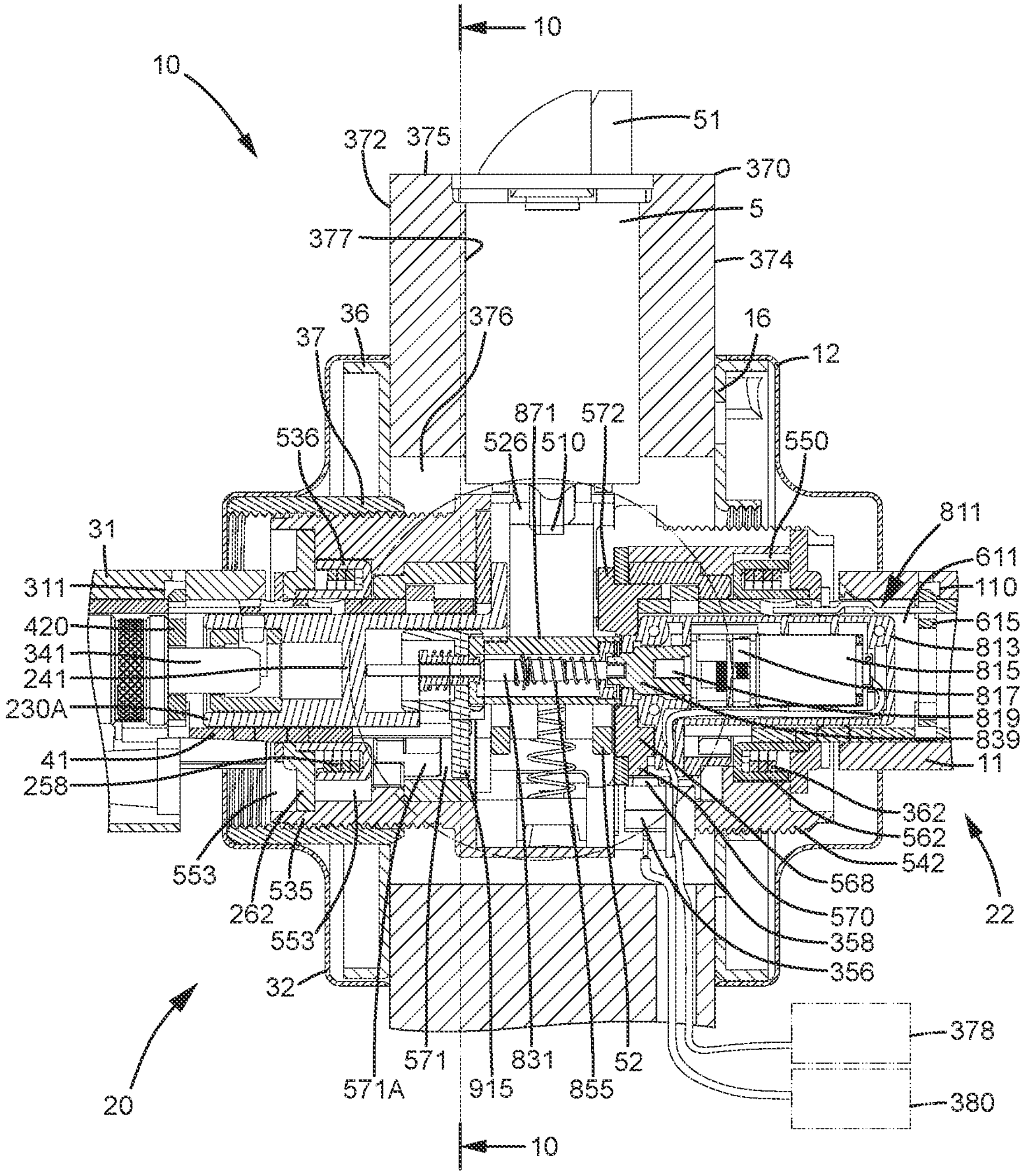
FIG. 8 is a cross sectional view illustrating an activation member in a second position.
Figure 9:
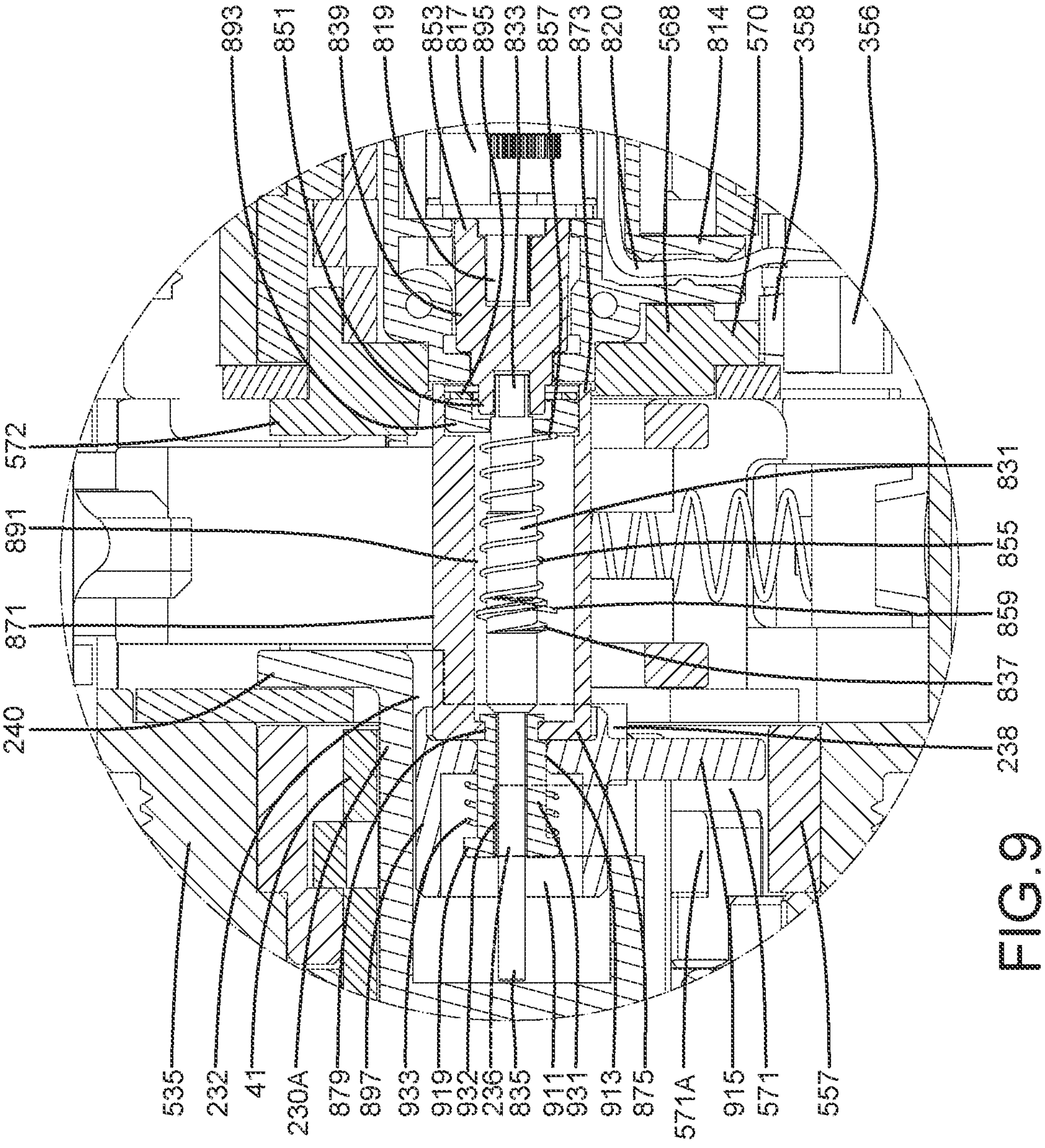
FIG. 9 is an enlarged view of a circled portion of FIG. 8.
Figure 10:
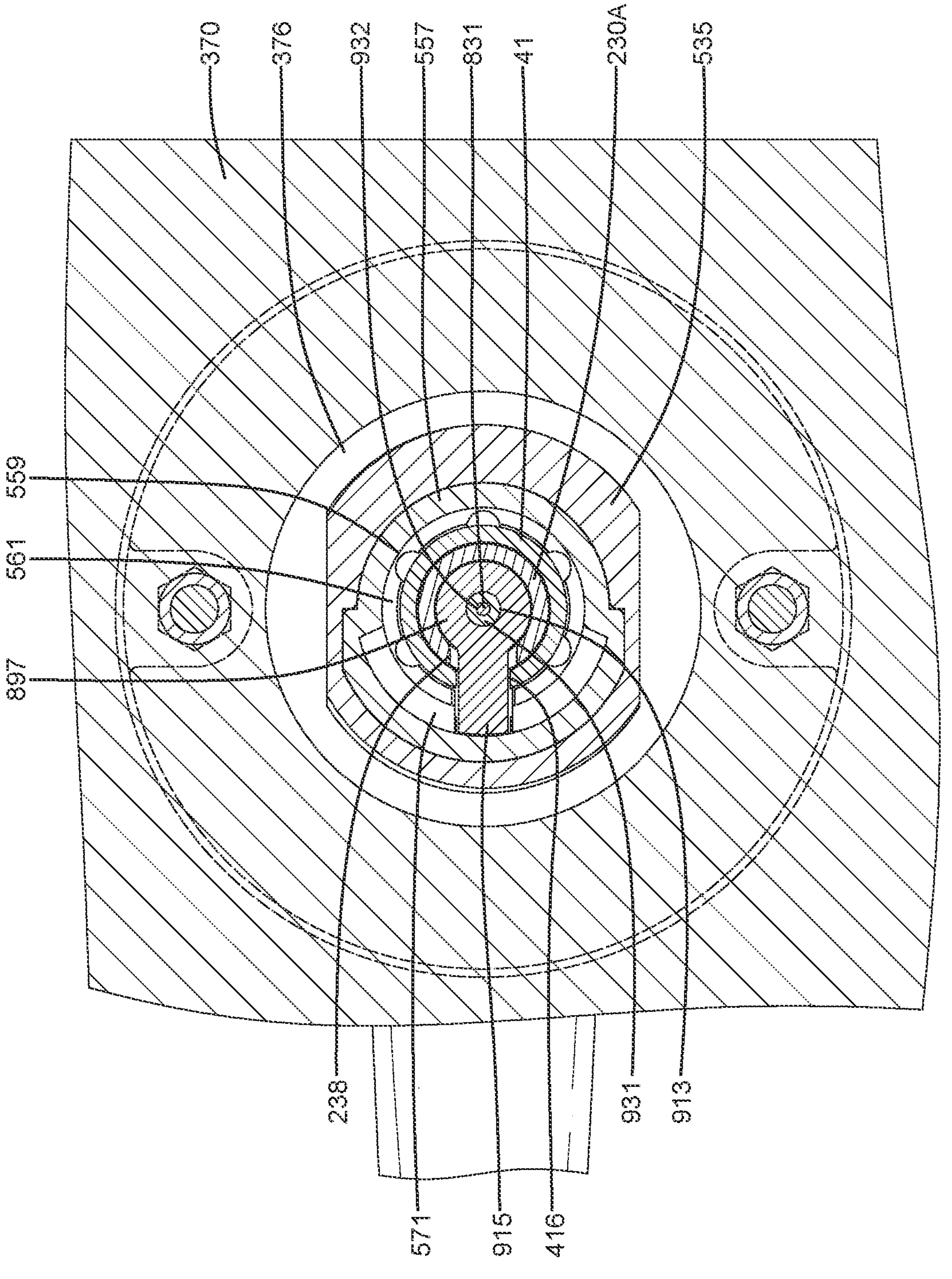
FIG. 10 is a cross sectional view taken along section line 10-10 in FIG. 8.

When it is desired to set door lock 10 to an unlocked state, lock driving device 811 is supplied with electricity by power supply 378, and motor 815 of lock driving device 811 rotates in the forward direction to rotate rotating shaft 831. Driving thread 837 of rotating shaft 831 pushes driving spring 855 to move toward end cap 893 along the longitudinal axis. After first driving section 857 of driving spring 855 abuts against end cap 893, further rotation of rotating shaft 831 causes driving spring 855 to push activation member 869 to move from the first position (FIGS. 6 and 7) to the second position (FIGS. 8-10) along the longitudinal axis. Thus, leg 915 of activation member 869 moves into limiting groove 571 of lining sleeve 557 and smaller groove section 238 of actuating member 230A.

Figure 11:
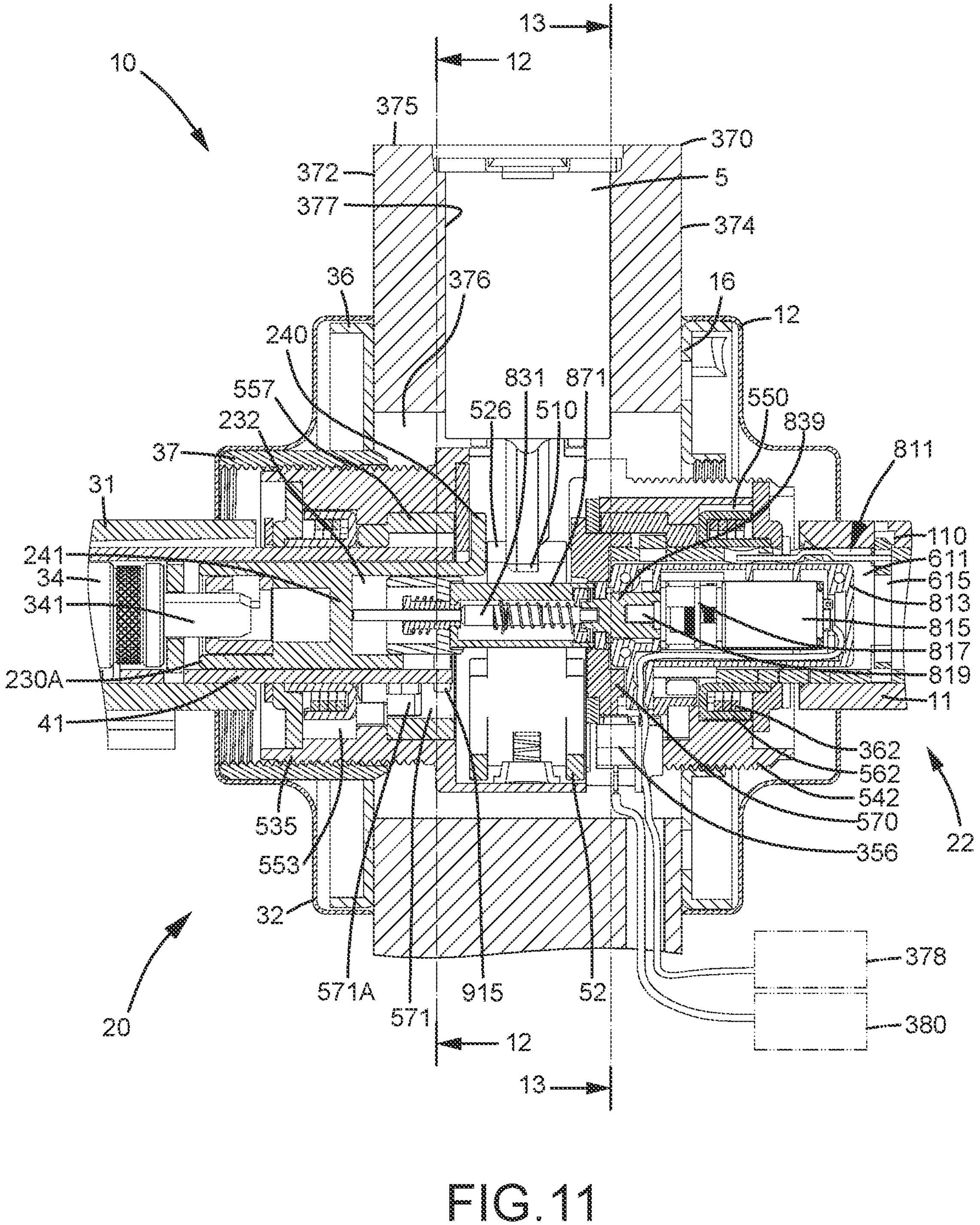
FIG. 11 is cross sectional view illustrating the activation member in the second position and with an outer handle rotated.
Figure 12:
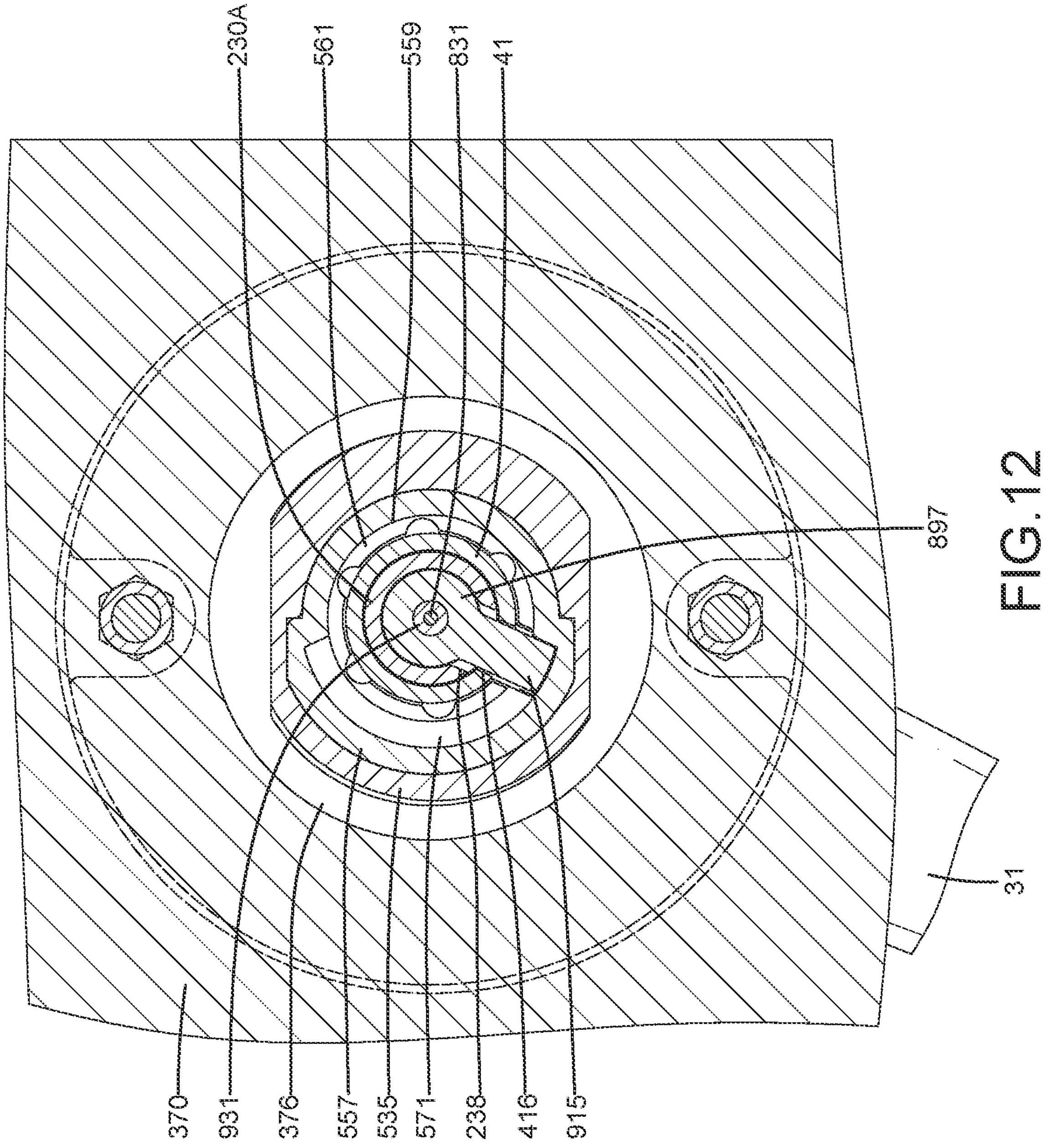
FIG. 12 is a cross sectional view taken along section line 12-12 in FIG. 11.

With reference to FIGS. 11-12, when activation member 869 is in the second position, activation portion 897 is permitted to pivot about the longitudinal axis of outer spindle 41, such that outer handle 31 can be operated to pivot outer spindle 41. Outer spindle 41 pushes leg 915 to cause pivotal movement of activation portion 897, whereas sleeve portion 871 does not pivot. Furthermore, leg 915 abuts against the inner wall of smaller groove section 238, such that actuating member 230A pivots jointly with leg 915. Lug 240 of actuating member 230A pushes first actuation wall 522 to move retractor 522 from the forward position to the rear position, and latch bolt 51 moves from the latching position to the unlatching position, thereby permitting opening of door 370.

Figure 13:
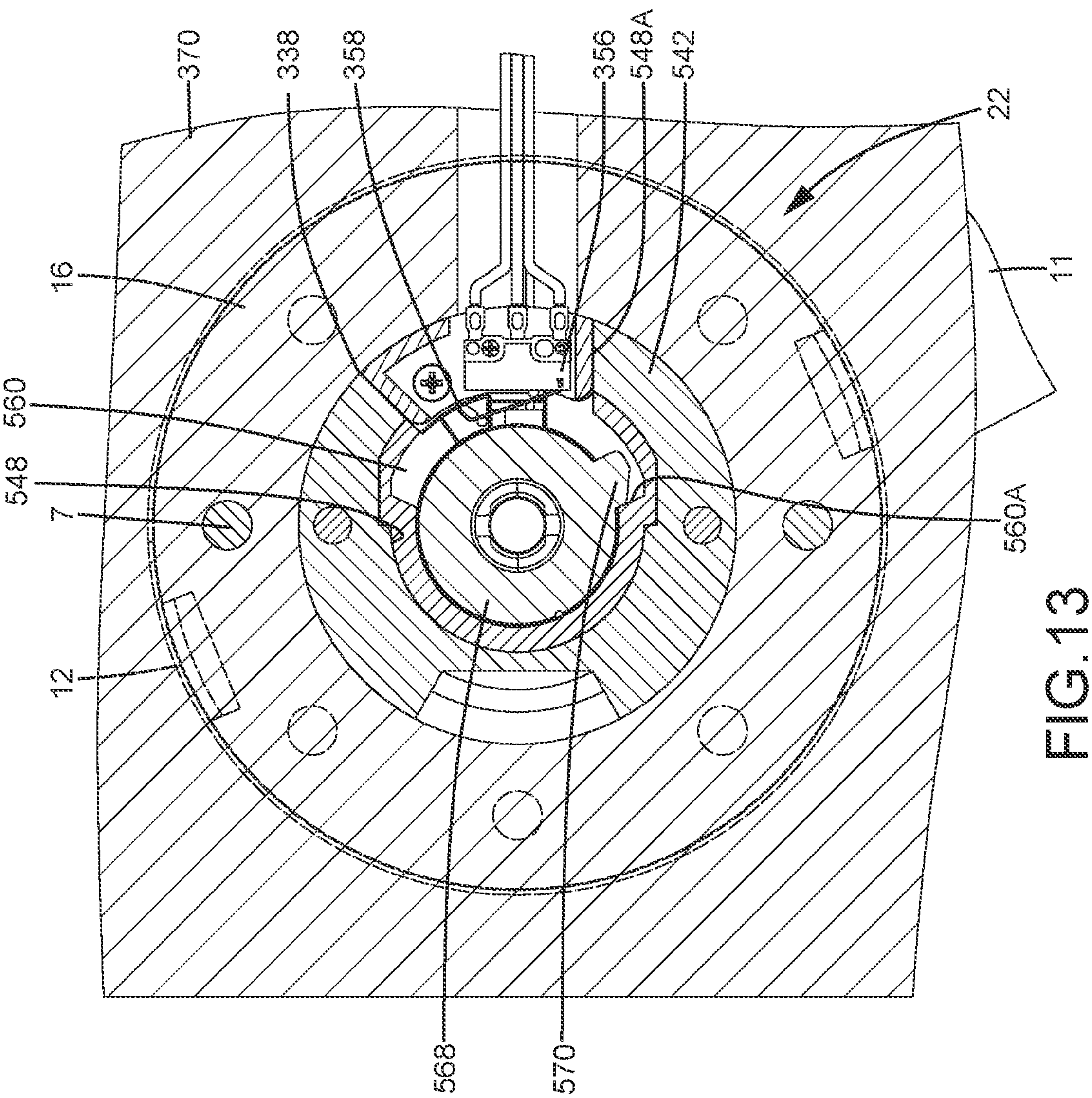
FIG. 13 is a cross sectional view taken along section line 13-13 in FIG. 11.

When latch bolt 51 moves from the latching position to the unlatching position, pressing block 570 of pressing member 568 disengages from pressing plate 358 of detection member 356 (FIG. 13). Furthermore, pressing block 570 of pressing member 568 abuts against restraining wall 560A of restraining groove 560 of lining sleeve 549 to restrain the rotational angle of inner handle 11. Returning of pressing member 568 will not be hindered by pressing plate 358 of detection member 356. Furthermore, inner spring 362 is twisted by actuating arm 564 when inner spindle 595 is rotated and drives inner follower ring 562, providing resiliency for returning inner handle 11 when inner handle 11 is released.

When it is desired to set door lock 10 from the unlocked state to the locked state, motor 815 drives rotating shaft 831 to rotate in the reverse direction, such that driving spring 855 moves away from end cap 893 along the longitudinal axis.

Thus, second driving section 859 presses against an end of guiding groove 891 adjacent to outer end 875 to thereby move activation member 869 from the second position to the first position. As a result, leg 915 is located in coupling groove 571A to prevent pivotal movement of activation portion 897. Accordingly, outer spindle 41 and outer handle 31 cannot pivot, and door lock 10 returns to the locked state.

Figure 14:
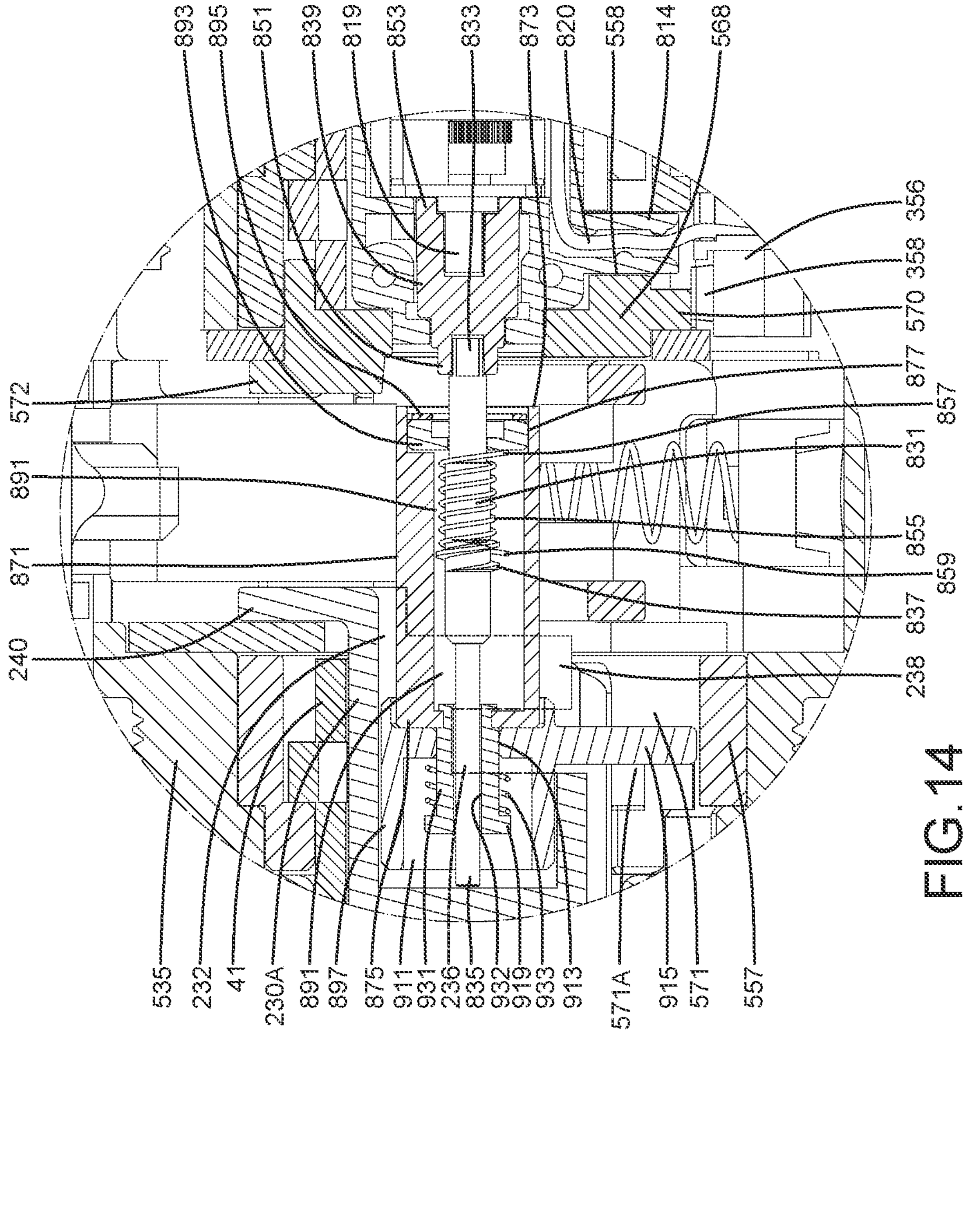
FIG. 14 is a cross sectional view illustrating the activation member stuck in a first position and with a shaft rotated in a forward direction to compress a driving spring.

With reference to FIG. 14, in a case that leg 915 gets stuck (such as when an external force is applied to outer handle 31) while activation member 869 is in the first position, activation member 869 cannot move along the longitudinal axis. Thus, when rotating shaft 831 rotates in the forward direction, although driving spring 855 moves toward end cap 893 along the longitudinal axis and presses against end cap 893, activation member 869 cannot move toward the second position along the longitudinal axis. In this case, a portion of the driving spring 855 between the first driving section 857 and the driving thread 837 is compressed to store elasticity. When the stuck situation of leg 915 is removed (such as release of the external force on outer handle 31), driving spring 855 can bias end cap 893 to move activation member 869 to the second position.

Figure 15:
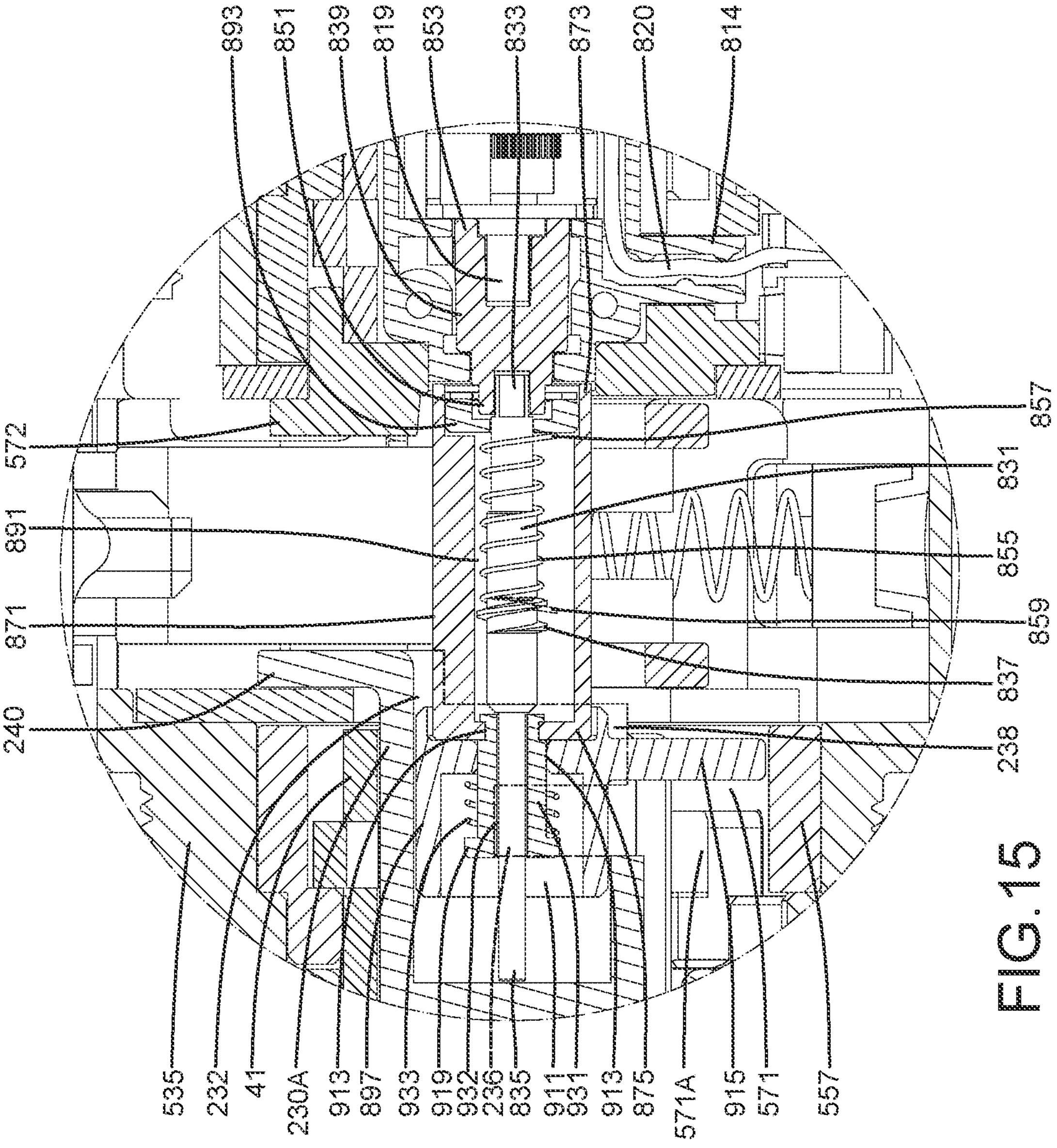
FIG. 15 is a cross sectional view illustrating the activation member in the second position and with the shaft rotated in a rearward direction to compress the driving spring.

With reference to FIG. 15, in a case that activation member 869 gets stuck in the second position and, thus, cannot move along the longitudinal axis, when rotating shaft 831 rotates in the reverse direction, although driving spring 855 moves away from end cap 893 along the longitudinal axis and presses against the end of guiding groove 891 adjacent to outer end 875, activation member 869 cannot move toward the first position along the longitudinal axis. In this case, another portion of the driving spring 855 between the second driving section 859 and the driving thread 837 is compressed to store elasticity. When the stuck situation of activation member 869 is removed, driving spring 855 can bias the end of guiding groove 891 adjacent to outer end 875 to move activation member 869 to the first position.

It is worth noting that since the spacing between first and second driving sections 857 and 859 of driving spring 855 along the longitudinal axis is smaller than the length of guiding groove 891 along the longitudinal axis, even if driving spring 855 undergoing movement is compressed due to none-movement of activation member 869, the compression extent of driving spring 855 is appropriate. Thus, the frictional force generated by driving spring 855 pressing against activation portion 897 via outer end 875 of sleeve portion 871 is appropriate, such that outer handle 31 can still operate smoothly.

The components of lock driving device 811 according to the present invention are significantly reduced in complexity to reduce difficulties in manufacturing. Furthermore, the number of components related lock driving device 811 is reduced to effectively reduce the manufacturing costs.

The spacing between first and second driving sections 857 and 859 of driving spring 855 along the longitudinal axis is smaller than the length of guiding groove 891 along the longitudinal axis, such that driving spring 855 can push activation member 869 to move, and excessive compression of driving spring 855 can be prevented while generating appropriate elasticity as well as avoiding interference between related components (the frictional force is appropriate).

Driving thread 837 has only two turns (two pitches), which can prevent excessive compression of driving spring 855.

Now that the basic teachings of the present invention have been explained, many extensions and variations will be obvious to one having ordinary skill in the art. For example, sleeve portion 871 and activation portion 897 of lock driving device 811 can be integrally formed as a single member. In this case, when outer handle 31 is pivoted, although activation member 869 and driving spring 855 also pivot, the pivotal angle of outer handle 31 is only about 45 degrees. Furthermore, after returning of outer handle 31, activating member 869 and driving spring 855 also return, avoiding adverse affection on substantial operation of lock driving device 811.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An electronic control door lock comprising:

a latch device including a latch bolt movable between a latching position and an unlatching position;

an inner operational device operatively connected to the latch device for moving the latch bolt from the latching position to the unlatching position;

an outer operational device operatively connected to the latch device for moving the latch bolt from the latching position to the unlatching position;

an activation member movable between a first position and a second position, wherein when the activation member is in the first position, the outer operational device is incapable of moving the latch bolt to the unlatching position, and wherein when the activation member is in the second position, the outer operational device is operable to move the latch bolt to the unlatching position;

a rotating shaft rotatably supported in the activation member and including a driving thread on an outer periphery thereof;

a motor disposed in the inner operational device and configured to drive the rotating shaft to rotate in a forward direction and a reverse direction; and a driving spring in threading connection with the driving thread, wherein when the rotating shaft rotates in the reverse direction, the driving spring actuates the activation member to move to the first position along a longitudinal axis, and wherein when the rotating shaft rotates in the forward direction, the driving spring actuates the activation member to move to the second position along the longitudinal axis;

wherein the activation member further includes a guiding groove extending along the longitudinal axis, wherein the driving thread and the driving spring are disposed in the guiding groove, wherein the driving spring includes first and second driving sections spaced from each other along the longitudinal axis, wherein a spacing between the first and second driving sections along the longitudinal axis is approximately ⅔ to ¾ of a length of the guiding groove along the longitudinal axis, wherein when the rotating shaft rotates in the forward direction, the first driving section actuates the activation member to move to the second position, wherein when the rotating shaft rotates in the reverse direction, the second driving section actuates the activation member to move to the first position, wherein when the activation member remains in the first position while the rotating shaft rotates in the forward direction, a portion of the driving spring between the first driving section and the driving thread is compressed, and wherein when the activation member remains in the second position while the rotating shaft rotates in the reverse direction, another portion of the driving spring between the second driving section and the driving thread is compressed;

wherein the guiding groove has elliptic cross sections, wherein each of the first and second driving sections is a rectilinear section extending in a tangential direction of the driving spring and abuts an inner surface of the guiding groove.

2. The electronic control door lock as claimed in claim 1, wherein the driving thread includes two turns.

3. The electronic control door lock as claimed in claim 1, further comprising a housing having an arm extending from an outer periphery of the housing, wherein the arm is non-rotatably coupled with the inner operational device, and wherein the motor is received in the housing.

4. An electronic control door lock comprising:

a latch device including a latch bolt movable between a latching position and an unlatching position;

an inner operational device operatively connected to the latch device for moving the latch bolt from the latching position to the unlatching position;

an outer operational device operatively connected to the latch device for moving the latch bolt from the latching position to the unlatching position;

an activation member movable between a first position and a second position, wherein when the activation member is in the first position, the outer operational device is incapable of moving the latch bolt to the unlatching position, and wherein when the activation member is in the second position, the outer operational device is operable to move the latch bolt to the unlatching position;

a rotating shaft rotatably supported in the activation member and including a driving thread on an outer periphery thereof;

a motor disposed in the inner operational device and configured to drive the rotating shaft to rotate in a forward direction and a reverse direction; and a driving spring in threading connection with the driving thread, wherein when the rotating shaft rotates in the reverse direction, the driving spring actuates the activation member to move to the first position along a longitudinal axis, and wherein when the rotating shaft rotates in the forward direction, the driving spring actuates the activation member to move to the second position along the longitudinal axis;

wherein the activation member includes:

a sleeve portion mounted around and rotatable relative to the rotating shaft, wherein the sleeve portion includes an inner end and an outer end spaced from the inner end along the longitudinal axis, wherein the sleeve portion further includes a guiding groove extending along the longitudinal axis and spaced from the inner end and the outer end, and wherein the driving thread and the driving spring are located in the guiding groove; and an activation portion in frictional contact with the outer end of the sleeve portion, wherein the activation portion further includes a leg extending in a radial direction perpendicular to the longitudinal axis, wherein the outer operational device includes an outer spindle and an outer handle coupled with the outer spindle to pivot therewith, wherein the leg and the outer spindle are movable along the longitudinal axis and are not pivotable relative to each other, and wherein when the rotating shaft rotates, the activation portion prevents rotation of the sleeve portion.

5. The electronic control door lock as claimed in claim 4, wherein the driving spring further includes first and second driving sections spaced from each other along the longitudinal axis, wherein a spacing between the first and second driving sections along the longitudinal axis is approximately ⅔ to ¾ of a length of the guiding groove along the longitudinal axis, wherein the first driving section faces the inner end of the sleeve portion, wherein the second driving section faces the outer end of the sleeve portion, wherein when the rotating shaft rotates in the forward direction, the first driving section actuates the activation member to move to the second position, wherein when the rotating shaft rotates in the reverse direction, the second driving section actuates the activation member to move to the first position, wherein when the activation member remains in the first position while the rotating shaft rotates in the forward direction, a portion of the driving spring between the first driving section and the driving thread is compressed, and wherein when the activation member remains in the second position while the rotating shaft rotates in the reverse direction, another portion of the driving spring between the second driving section and the driving thread is compressed.

6. The electronic control door lock as claimed in claim 4, further comprising:

a limiting member including a head and a shank extending from the head, wherein the shank of the limiting member and the activation portion are coupled and movable along the longitudinal axis; and a limiting spring mounted around the shank and located between the activation portion and the head, wherein the limiting spring biases the activation portion to press against the outer end of the sleeve portion, such that a frictional force is generated between the sleeve portion and the activation portion.

7. The electronic control door lock as claimed in claim 4, wherein the outer operational device further includes an actuating member pivotably mounted around the outer spindle, wherein the actuating member includes a stop wall on an inner side thereof, wherein the actuating member is operatively connected to the latch device, wherein when the actuating member pivots, the latch bolt is movable between the latching position and the unlatching position, wherein the activation portion is pivotably received in the actuating member, wherein the rotating shaft further includes an abutting end and a coupling end spaced from the abutting end along the longitudinal axis, wherein the motor is configured to couple with the coupling end to drive the rotating shaft to rotate, and wherein the abutting end is adjacent to the stop wall.

* * * * *